United States Patent
Doken et al.

(10) Patent No.: US 12,432,399 B2
(45) Date of Patent: Sep. 30, 2025

(54) SYSTEMS AND METHODS FOR SWITCHING BETWEEN ALTERNATE SCENE OBJECTS DURING LIVESTREAMING

(71) Applicant: Adeia Guides Inc., San Jose, CA (US)

(72) Inventors: Serhad Doken, Bryn Mawr, PA (US); Dhananjay Lal, Englewood, CO (US); Tao Chen, Palo Alto, CA (US); Ning Xu, Irvine, CA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/443,053

(22) Filed: Feb. 15, 2024

(65) Prior Publication Data
US 2025/0267314 A1    Aug. 21, 2025

(51) Int. Cl.
*H04N 21/234* (2011.01)
*G06T 7/70* (2017.01)
(Continued)

(52) U.S. Cl.
CPC ......... *H04N 21/23418* (2013.01); *G06T 7/70* (2017.01); *G06T 17/00* (2013.01);
(Continued)

(58) Field of Classification Search
None
See application file for complete search history.

(56) References Cited

U.S. PATENT DOCUMENTS

| 2004/0266336 A1* | 12/2004 | Patsiokas | H04H 40/90 |
| | | | 455/3.06 |
| 2007/0226761 A1* | 9/2007 | Zalewski | H04N 21/478 |
| | | | 725/35 |

(Continued)

FOREIGN PATENT DOCUMENTS

| CN | 113613062 A | * | 11/2021 | ......... H04N 21/4312 |
| JP | 6853858 B2 | * | 3/2021 | ....... H04N 21/25891 |

OTHER PUBLICATIONS

Amazon Live (https://www.amazon.com/live) (printed Jan. 30, 2024) (5 pages).

(Continued)

*Primary Examiner* — William J Kim
(74) *Attorney, Agent, or Firm* — Haley Guiliano LLP

(57) ABSTRACT

Systems and methods are described for replacing an object being presented in a livestream with a secondary object that is personalized to a user that is consuming the livestream and rendering the livestream with the secondary object are described. The methods identify a target object in a livestream based on certain selection factors. A secondary object that is contextually related to the target object and selected based on selection factors is selected. A 2D-to-3D conversion of the scene description is performed to generate a 3D model. A replacement option is selected. The attributes of the secondary object based on its 3D model are matched with attributes of the target object based on its generated 3D model. Quality checks and scalability options are explored. The livestream is re-rendered with the secondary object having replaced the target object.

25 Claims, 18 Drawing Sheets

(51) Int. Cl.
  *G06T 17/00* (2006.01)
  *G06T 19/20* (2011.01)
  *G06V 20/40* (2022.01)
  *H04N 21/2187* (2011.01)
  *H04N 21/258* (2011.01)
  *H04N 21/478* (2011.01)
(52) U.S. Cl.
  CPC .............. *G06T 19/20* (2013.01); *G06V 20/41* (2022.01); *H04N 21/2187* (2013.01); *H04N 21/25891* (2013.01); *H04N 21/47815* (2013.01); *G06T 2207/10016* (2013.01); *G06T 2210/16* (2013.01); *G06T 2219/004* (2013.01); *G06T 2219/2004* (2013.01); *G06T 2219/2021* (2013.01); *G06V 2201/10* (2022.01)

(56) References Cited

U.S. PATENT DOCUMENTS

| | | | | |
|---|---|---|---|---|
| 2008/0033801 | A1* | 2/2008 | McKenna | H04N 21/2665 705/14.4 |
| 2009/0094637 | A1* | 4/2009 | Lemmons | H04N 21/23418 725/40 |
| 2010/0122286 | A1* | 5/2010 | Begeja | G06Q 30/02 725/34 |
| 2010/0166159 | A1* | 7/2010 | Katis | H04L 12/1822 379/88.13 |
| 2011/0153663 | A1* | 6/2011 | Koren | H04N 21/44224 707/E17.039 |
| 2016/0112729 | A1* | 4/2016 | Sayed | H04N 21/44218 725/10 |
| 2017/0099511 | A1* | 4/2017 | Grover | H04N 21/8352 |
| 2017/0193686 | A1* | 7/2017 | Mullins | G06F 3/005 |
| 2017/0330225 | A1* | 11/2017 | Krosky | H04L 51/02 |
| 2018/0122424 | A1* | 5/2018 | Harvill | H04N 21/8166 |
| 2019/0342620 | A1* | 11/2019 | Yan | H04N 21/4312 |
| 2020/0327378 | A1* | 10/2020 | Smith | G06N 5/048 |
| 2021/0120286 | A1* | 4/2021 | Govil | H04N 21/234318 |
| 2021/0176529 | A1* | 6/2021 | Patel | H04N 21/47214 |
| 2022/0337911 | A1* | 10/2022 | Bayat | H04N 21/812 |

OTHER PUBLICATIONS

Amazon Staff, "Amazon makes shopping easier with Virtual Try-On for Shoes," https://www.aboutamazon.com/news/retail/amazon-makes-shopping-easier-with-virtual-try-on-for-shoes (Jun. 9, 2022) (4 pages).
Chang et al., "Mono-STAR: Mono-camera Scene-level Tracking and Reconstruction," Computer Science > Robotics (arXiv:2301. 13244) Jan. 30, 2023 (7 pages).
Gao et al., "GET3D: A Generative Model of High Quality 3D Textured Shapes Learned from Images," Nvidia Toronto AI Lab (2022) (9 pages).
Hong et al., LRM: Large Reconstruction Model for Single Image to 3D, (https://arxiv.org/pdf/2311.04400.pdf) (Nov. 8, 2023) (23 pages).
Hu et al., "RandLA-Net: Efficient Semantic Segmentation of Large-Scale Point Clouds," (https://arxiv.org/pdf/1911.11236.pdf) (May 1, 2020) (16 pages).
Lin et al., "Leveraging Intrinsic Properties for Non-Rigid Garment Alignment," Proceedings of the IEEE/CVF International Conference on Computer Vision (ICCV), 2023, pp. 14485-14496.
Liu et a;. Static Scene Illumination Estimation from Video with Applications, Journal of Computer Science and Technology, X(Y):1-12 (2017).
Neuberger et al., "Image Based Virtual Try-on Network from Unpaired Data," https://assets.amazon.science/1a/2b/7a4dd8264ce19a959559da799aff/scipub-1281.pdf (downloaded Jan. 30, 2024) (10 pages).
Peters, "The NBA app is going to let you digitally possess a live player," (https://www.theverge.com/2023/2/17/23604719/nba-app-possess-overlay-yourself-live-game) Feb. 17, 2023 (5 pages).
Qi et al., "PointNet: Deep Learning on Point Sets for 3D Classification and Segmentation," 2017 IEEE Conference on Computer Vision and Pattern Recognition (CVPR), Honolulu, HI, USA, 2017, pp. 77-85 (9 pages).
Seyfioglu et al., "Diffuse to Choose: Enriching Image Conditioned Inpainting in Latent Diffusion Models for Virtual Try-All," https://diffuse2choose.github.io) (Jan. 24, 2024) (18 pages).
Seyfioglu et al., "Diffuse to Choose: Enriching Image Conditioned Inpainting in Latent Diffusion Models for Virtual Try-All," diffuse2choose.github.io, (downloaded Jan. 30, 2024) (11 pages).
Seyfioglu et al., Video Clips from Video—https://diffuse2choose.github.io/static/videos/Diffuse_to_Choose_DemoReel.mp4 (downloaded Jan. 30, 2024).
Shi et al., "Visual Quality Evaluation of Image Object Segmentation: Subjective Assessment and Objective Measure," IEEE Transactions on Image Processing, 24(12):5033-5045 (2015).
Twitter, "NBA Commissioner Adam Silver unveils streaming experience of the future via the NBA App—and you can be in it!," (https://twitter.com/NBA/status/1626644088593211393) Feb. 17, 2023 (2 pages).
Xiang et al., "PoseCNN: A Convolutional Neural Network for 6D Object Pose Estimation in Cluttered Scenes," Computer Science > Computer Vision and Pattern Recognition, (arXiv:1711.00199) Nov. 1, 2017 (10 pages).
Xu et al., "33DiffTection: 3D Object Detection with Geometry-Aware Diffusion Features," Computer Science > Computer Vision and Pattern Recognition (arXiv:2311.04391) Nov. 7, 2023 (17 pages).
Ying et al., "OmniSeg3D: Omniversal 3D Segmentation via Hierarchical Contrastive Learning," (arXiv:2311.11666) Nov. 20, 2023 (11 pages).
YouTube Video, "How to do a Clothing Transitions in Instagram Reels", (https://www.youtube.com/watch?v=fSPnbTNz2jM&t=74s), (68,668 views, Oct. 6, 2021), (3 pages).

* cited by examiner

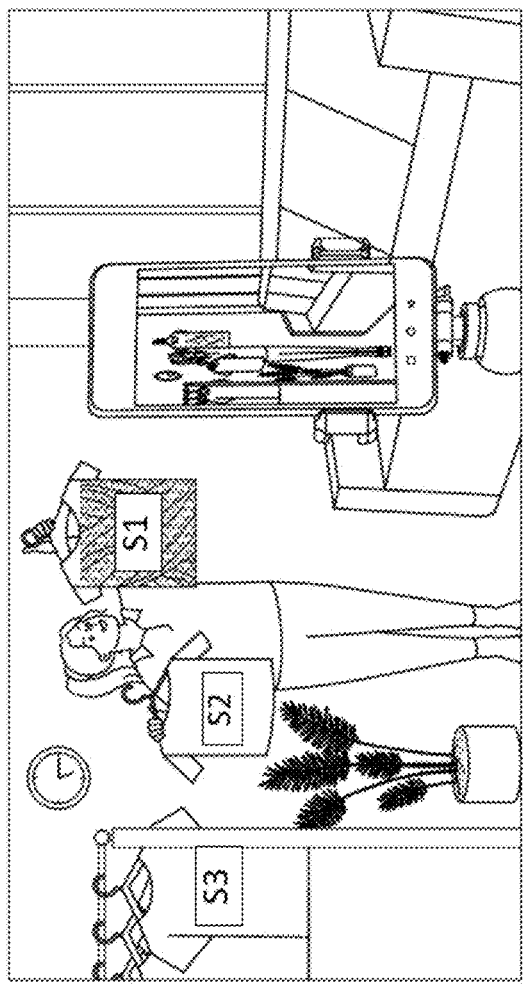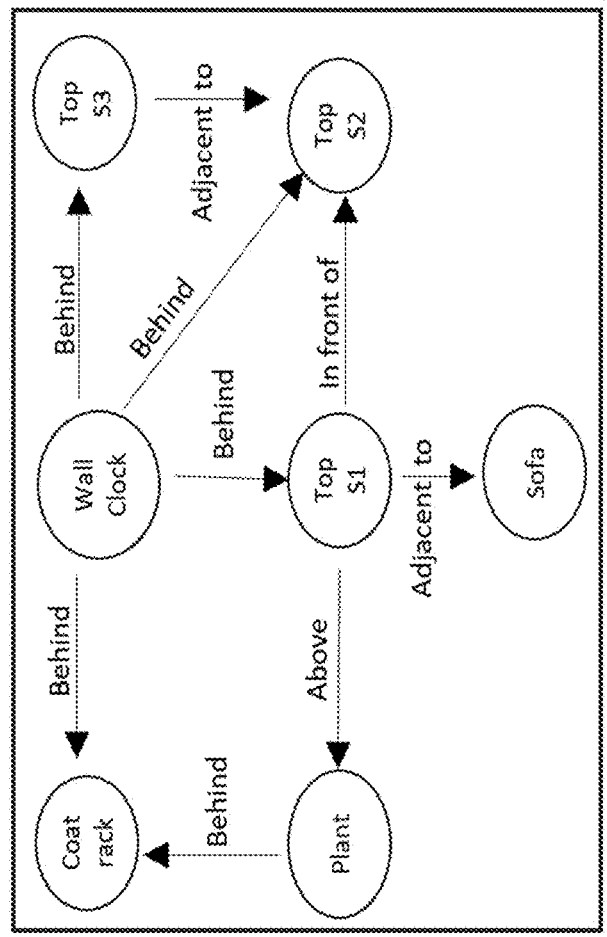
FIG. 8

| Target Object Selection Options | |
|---|---|
| E-Commerce | - Access purchase history<br>• You purchased a similar shirt 2 years ago<br>• Provide notification: This is a newer design of the same shirt |
| Profile | - Access user profile<br>• Determine products of interest from user profile |
| Presentation | - Identify which object is being showcased in the livestream and select the object being presented |
| AI/ML | - Automatically select target objects based on AI/ML data |
| E-Catalog | - Determine list of products that are to be presented and select target objects from the e-catalog |

FIG. 9

SYSTEMS AND METHODS FOR SWITCHING BETWEEN ALTERNATE SCENE OBJECTS DURING LIVESTREAMING

FIELD OF INVENTION

Embodiments of the present disclosure relate to replacing an object being presented in a livestream with a secondary object that is personalized to a user that is consuming the livestream and seamlessly rendering the livestream with the replaced object. Embodiments of the present disclosure also relate to multicasting the livestream to a plurality of users simultaneously and providing a different personalization to each consuming user.

BACKGROUND

Live video shopping is a trend that has a lot of momentum in certain parts of the world, and it is also starting to become prevalent in the United States as well. From the early days of the QVC channel on linear TV, to today's livestreams on popular platforms such as TikTok™, Instagram™, and YouTube™ many features have been added to the consumer experience.

One of the goals of live shopping is for a presenter to showcase a product and engage consumers, such as by answering their questions, to market the product. Certain platforms have also started recruiting influencers with the hopes that they will increase sales. Influencers and others also create videos of their own that display the products or change products from time to time. For example, using social media video posts such as Instagram Reels™, changing items/objects/clothes is a popular feature. There are many tutorials explaining to platform users how to create content that makes that switch possible. Primarily, users are taught to create a delineation point in their video between the shots where the switch happens and edit their video clip accordingly. Although it's a useful feature to showcase several products, the process is a cumbersome and manual. It requires manual video editing and selection of delineation points.

Another problem with the current videos and live shopping platforms that switch between products is that the switch is not live or in real time. Typically, it's a recorded video in which video editing was done manually to make the switch, and the final cut with the switch is what is being shown.

Yet another problem with the current videos and live shopping platforms is that the switch between products does not consider the different interests of their audience members. For example, if a first shirt is switched with a second shirt, the same switch is shown to all the viewers. Since some users may not prefer the second shirt, their preferences are not taken into consideration. It's a one-size-fits-all approach, which is not appealing to consumers.

A further problem with the current methods is that the switch between products has several glitches in image continuity, especially since it is performed manually. In other words, a gap in the video frames is usually noticeable to the user, which takes away from the video consumption experience.

As such, there is a need for a system and method that provides a more efficient and effective technique for switching between products, considering user preferences for each consuming user, and making the switch seamless.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIG. 8 is an example of a depth graph generated based on scene description of a livestream in which a target object(s) is presented by a presenter, in accordance with some embodiments of the disclosure;

FIG. 9 is a block diagram of target object selection options, in accordance with some embodiments of the disclosure;

DETAILED DESCRIPTION

Figure 1:
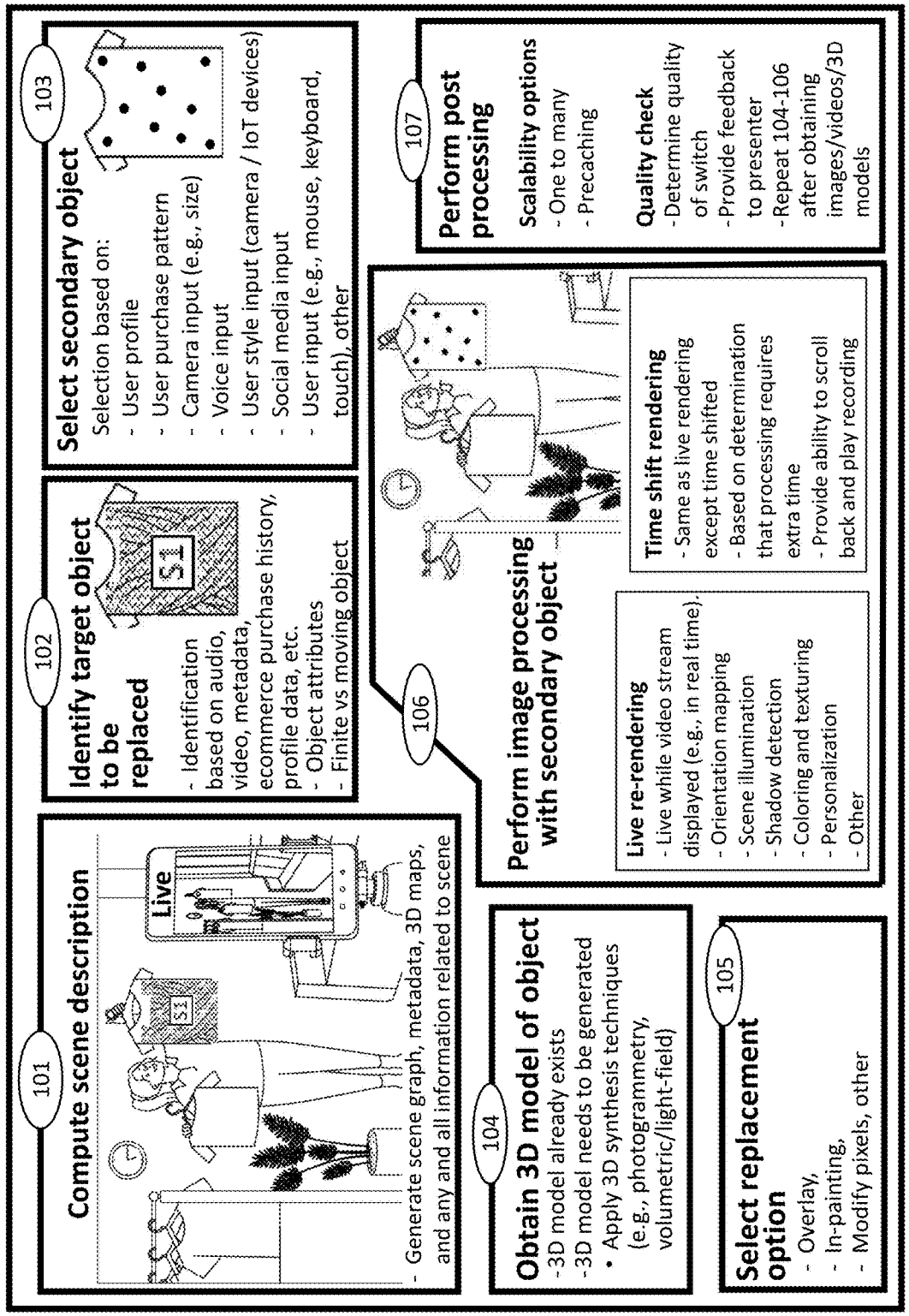
FIG. 1 is a block diagram of a process for replacing a target object(s) in a livestream, in accordance with some embodiments of the disclosure.

In accordance with some embodiments disclosed herein, some of the above-mentioned limitations are overcome by streaming a live video (referred to as a livestream) to a plurality of users simultaneously, replacing an object being presented in a livestream, while the livestream is in progress, with a secondary object that is personalized to each user, from a plurality of users, that is consuming the livestream, and ensuring that the replaced secondary object blends into the livestream to provide an appearance similar to the previously presented object or provides an alternative appearance that has a resemblance to the previously presented object but for a change in size, color, texture etc.

In some embodiments, a livestream is filmed and livestreamed to a plurality of viewers simultaneously. The filming of the livestream may occur in a confined space where the objects are fairly stationary, such as a studio where the products being shown do not have a movement of their own, such as garments, shoes, bags, electronic devices, furniture, etc. The filming of the livestream may also occur in an open space where the objects have their own movement, such as a car driving on a road, a basketball player playing basketball on a court, a runway model walking the runway, etc.

When a livestream is detected, its scene description may be processed or computed. Such processing or computation may include obtaining or retrieving any and all descriptions, details, relationships, and associations of objects within the livestream, including, but not limited to, spatial locations, spatial relationships, attribute details of each object in the livestream, illumination of each object, geometry and size of each object, and/or metadata associated with the scene or objects within the scene.

Once a scene description has been computed and details of the objects in the livestream have been obtained, one or more objects in the livestream may be selected as target objects that are to be replaced by secondary objects that are personalized for the user consuming the livestream. Since at any given time a plurality of users, such as tens or hundreds of users or more, may be consuming the livestream, the personalization would vary from user to user, i.e., there may be different secondary objects used for each separate user that are personalized based on the user preferences or recommendations that are specific and personal to that specific user.

Identification and selection of the target object(s) may be based on one or more factors. One of such factors may include e-commerce. Using this selection factor, the system may determine whether the user consuming the livestream previously purchased, liked, or browsed the same object, e.g., the same product, being showcased in the livestream or has placed it onto a wish-list at any e-commerce site. Since such a prior purchase, browsing, or saving for later is an indication of interest by the user in the object being showcased in the livestream, the object may automatically (or upon user approval) be selected as the target object. In some instances, a notification may also be sent to the user informing the user that they previously purchased the same or a similar object or that the current object is an updated version of the previously purchased object. Other factors may also be used in identifying and selecting a target object(s) from the livestream. For example, the target object may also be identified directly from the livestream by analyzing the video itself. In this scenario, speech recognition may be used to identify what the host is selling, and combined with visual recognition of what the host is holding, pointing, or trying to promote and identify the target object on that basis.

A secondary object may also be selected. The system may use one or more secondary object selection factors to select a secondary object for replacing the identified target object. The secondary object is a personalized version of the target object; it may bear some relationship to the target object, such as a contextual or semantic relationship to the target object. The secondary object may also share at least one attribute with the target object and may also be in the same genre. The selection factors for selecting the secondary object may include selection based on user preferences listed in the user profile, purchase patterns, manual selection using a user interface, user visual or audio input during the livestream, and any other data that may indicate a user preference for a variation of the target object (e.g., user social media posts, texts, emails, etc.)

To replace the target object with the personalized secondary object, the system may perform a 2D to 3D and then back to 2D conversion of the livestream. The first 2D to 3D conversion may be to generate a 3D model of the target object. Techniques like photogrammetry and other techniques may be used to generate the 3D model as well as obtain metadata associated with the target object. A 3D model of the secondary object may also be obtained or created if one is not available. Various aspects of the target object's 3D model may be mapped on to the secondary object's 3D model. Such modelling and 3D mapping may be performed to ensure that the secondary object replicates all effects of the target object such that when replaced, the secondary object provides the same appearance in the livestream as the target object did prior to the replacement. Such mappings from target object to the secondary object may include orientation mapping, scene illumination, shadow detection and replication, using the same quality video frames etc. For example, orientation mapping may ensure that the replaced secondary object is oriented in the same manner as the target object in the livestream prior to the replacement. Once the 3D-to-3D replacements are completed, the livestream may be converted back to a 2D video and streamed to the plurality of users.

Since the livestream may need to be personalized by replacing the target object with a personalized secondary object for multiple users (e.g., tens, hundreds, thousands, or more), some embodiments provide a plurality of scalability solutions that include a) pre-loading and pre-caching 3D models, b) communicating only the modifications and not the entire scene, c) adapting processing based on the complexity of the image, and d) performing processing in the cloud. In yet another embodiment, another option may be to convert the entire livestream into a 3D such that the entire 3D scene may be replaced with the 3D object. Once the object is replaced, the livestream may be converted back to 2D for display.

One such scalability solution may be to pre-load and pre-cache 3D models for target objects that are to be displayed in the livestream. If the upcoming target objects are pre-loaded and pre-cached, information from the host relating to which products will be displayed in the livestream may be available prior to their display, the upcoming target objects may be pre-loaded and cached thereby making them ready for replacement.

Scalability solutions that compute the original livestream but send only the modifications to each user, rather than the entire scene description may also be implemented. Accordingly, a cloud server may compute the scene description and allow the end device, e.g., the client device or an edge device, to receive the modification and apply it to the livestream. By doing so, computational resources may be saved, shifted, or re-distributed.

Turning to the figures, FIG. 1 is a block diagram of a process for replacing a target object(s) in a livestream, in accordance with some embodiments of the disclosure. The process 100 may be implemented, in whole or in part, by systems or devices such as those shown in FIGS. 2-3. One or more actions of the process 100 may be incorporated into or combined with one or more actions of any other process or embodiments described herein. The process 100 may be saved to a memory or storage (e.g., any one of those depicted in FIGS. 2-3) as one or more instructions or routines that may be executed by a corresponding device or system to implement the method 100.

Figure 2:
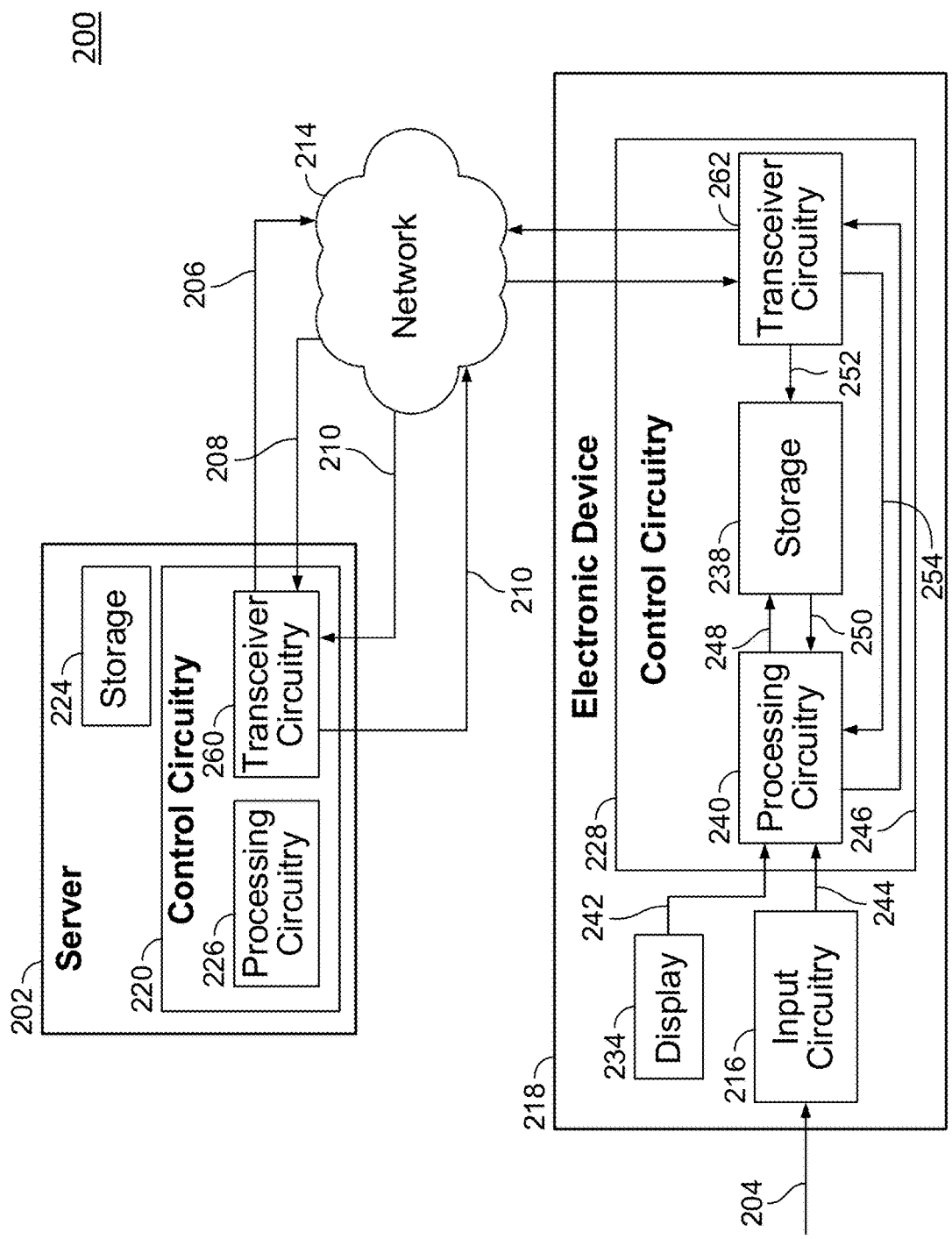
FIG. 2 is a block diagram of an example system for replacing the target object(s) in the livestream, in accordance with some embodiments of the disclosure.

In some embodiments, at block 101, the control circuitry, such as the control circuitry 200 and/or 228 of the system, such as the system in FIG. 2, may compute a scene description of a livestreamed video. The livestreamed video is a video that is streamed live and in real time from one host device to a plurality of client devices. An example of such a livestreamed video may be shopping or e-commerce livestreams such as Amazon Live™, TalkShopLive™, Grip™, Facebook Live Shopping™, Instagram Live Shopping™, and Livescale™. In addition to shopping or e-commerce livestreams, livestreams may also be presented via YouTube Live™, Facebook Live™, Vimeo livestream™ and others.

Figure 4:
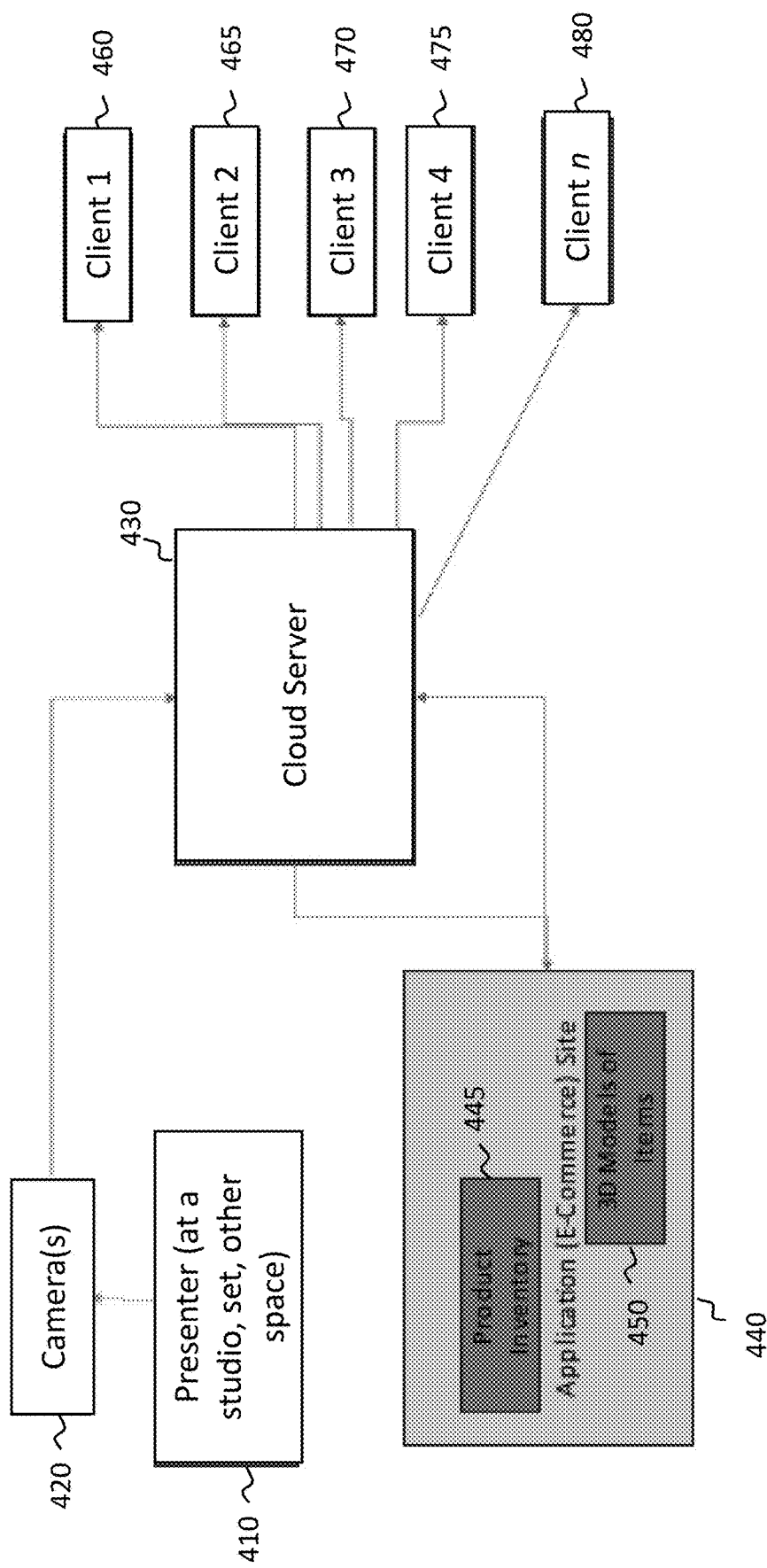
FIG. 4 is a block diagram of an example system for multicasting personalized secondary objects to different users during a livestream, in accordance with some embodiments of the disclosure.

One exemplary setup for such a livestreaming session is depicted in FIG. 4. In some embodiments, the livestreaming session may be established between a presenter at block 410 and a plurality of client devices 460-480 via a cloud server 430. The livestreaming session allows streaming of content, such as videos, to multiple client devices simultaneously. It is similar to broadcasting to several viewers, in some instances, hundreds, thousands, or hundreds of thousands of client devices, from one host.

In some embodiments, the space from which the host may generate the livestream may be, as depicted in block 410, a studio, set, or some other confined space. The host may use a camera 420, which may be an independent device or a camera that is integrated into another electronic device to record and stream a live video stream. In some embodiments, the presenter may be presenting one or more products to their audience, e.g., potential customers of the product. The presenter may be showcasing their products, such as traditionally done on QVC or shopping networks shown on television, but through a live video stream and in real time.

In some embodiments, by establishing the livestream, client devices may be able to interact with the host or the platform that is used to present the livestream. The interaction may be via audio, video, chat, or selection of a product displayed via a mouse, keypad, touchscreen or the like.

The host or presenter 410 may be video recording and streaming it as a livestream video (also referred to herein as video) by using an electronic device, such as a laptop, smart TV, mobile phone, professional camera, or any other electronic device that is capable of connecting to the internet to provide a livestreaming session. The host may also use a plug-in for a social media streaming service such as Twitch™ to livestream their video to a plurality of client devices.

In some embodiments, when the host is presenting a product, or a line of product, through the livestream video, they may access an application site, such as an e-commerce site. Some examples of such sites include Amazon™, Walmart™, eBay™, Target™, Gap™, etc. The host may be pulling products from such e-commerce sites and showcasing them to the plurality of client devices joined into the streaming session.

In other embodiments, the host may be presenting their own products and not accessing any e-commerce site. They may access a library or database that may be privately stored and may selectively showcase products from that library.

Examples of types of products that may be shown via the livestream video may include clothing, houseware, shoes, travel deals, automobiles, home- and kitchen-related items, video games, and any real or virtual products. In addition to such products that are finite, the host, or the streaming platform used for livestreaming the video, may also present a moving object. Some examples of such moving objects include automobiles shown while they are being driven; a sporting event, such as the basketball game depicted in FIG. 10; or any other object or person that is being shown in motion.

Referring to block 101 of FIG. 1, when such a livestream is detected, such as by a client device or another type of server (such as the cloud server) or intermediary device, the control circuitry, such as the control circuitry 200 and/or 228, may initiate computing or processing of the livestreamed video. To do so, the control circuitry 200 and/or 228 may compute the scene description. As referred to herein, computing or generating a scene description may refer to obtaining or retrieving any and all description, details, relationships, and associations of objects within a scene, including, but not limited to spatial locations, spatial relationships, attribute details, metadata associated with the scene or objects within the scene, and/or geometry of objects within the scene. A scene description may also include attributes and details associated with each object within the scene, such as each object's color, size, shape, texture, motion, and its relation and association with other objects in the scene. A scene description may be expressed via a set of scene descriptors or a combination thereof. In some instances, the descriptors may be in a specific format or language such as an MPEG-7 format, text format (XML), binary format representing its metadata, or any combination thereof.

In some embodiments, computing or generating a scene description may mean generating a 3D model from a plurality of images of the livestream. To do so, the control circuitry 200 and/or 228 may leverage many 2D video frames in the received livestream as photogrammetry images to build the 3D model over time. Since a camera orientation may provide a plurality of angles to work with, the control circuitry 200 and/or 228 may perform an image synthesis of all the 2D video frames from a plurality of angles to generate a 3D model. More specifically, the control circuitry 200 and/or 228 may use a generative 3D model that can synthesize high-quality 3D polygon meshes with any topology. The generated 3D model may include a 3D model of each object in the frame and provide the capability to fully edit the 3D objects. For example, it may allow edits such as rotating, scaling, lighting, etc. The control circuitry 200 and/or 228 may also leverage two sets of metadata branch. The first branch, which may be the geometry branch, may be leveraged by the control circuitry 200 and/or 228 to generate the polygon mesh with any desired topology. The second metadata branch, which may be a texture branch, may be leveraged by the control circuitry 200 and/or 228 to generate a texture field that can represent colors and textures. Some examples of textures may include specific materials at the surface points of the polygon mesh. The two sets of metadata, due to their 3D nature, may provide information relating to the objects present in the 2D frame of the livestream. They may also provide relationships and association between the objects in the 2D frame of the livestream. For example, the two sets of metadata may be used to determine which objects are in the foreground and which objects are in the background. They may also provide information relating to which object is next to, in front of, or behind another object to determine the spatial relationship between the objects.

A scene description may also include depth maps. These depth maps may provide information relating to the depth of objects from a point of view, such as a point of view from the camera used for filming the livestream. They may also provide information relating to at what depth or distance each object is with respect to the others.

In some embodiments, at a minimum, the scene description may include geometry of objects in the scene, point of view from a camera angle, and lighting and shadows associated with each object.

In some embodiments, the scene description may include a description of what people are seeing at their client devices. In other embodiments, the scene description may include scene graphs that may be compressed, uncompressed, in 2D, or in 3D. In yet other embodiments, the scene description may include semantic and non-semantic relationships between objects in the scene. In some more embodiments, the scene description may include a .USD (Universal Scene Description) file that encapsulates details of the livestream.

In some embodiments, a scene description may include representations of a plurality of pixels that collectively form a mesh. In such an embodiment, instead of a scene, a mesh of pixels may be computed to determine relationships between the pixels and what the pixels represent (e.g., objects in the livestream). To describe more broadly, a scene description may include any and all details associated with how the scene is composed and how every single element within the scene is composed and each element's relationship to other objects.

Although a few embodiments of scene description are provided above, the embodiment are not so limited. For example, the scene description may also include other representations like 3D point cloud, NeRF (neural radiance field), or 3D Gaussians.

Figure 10:
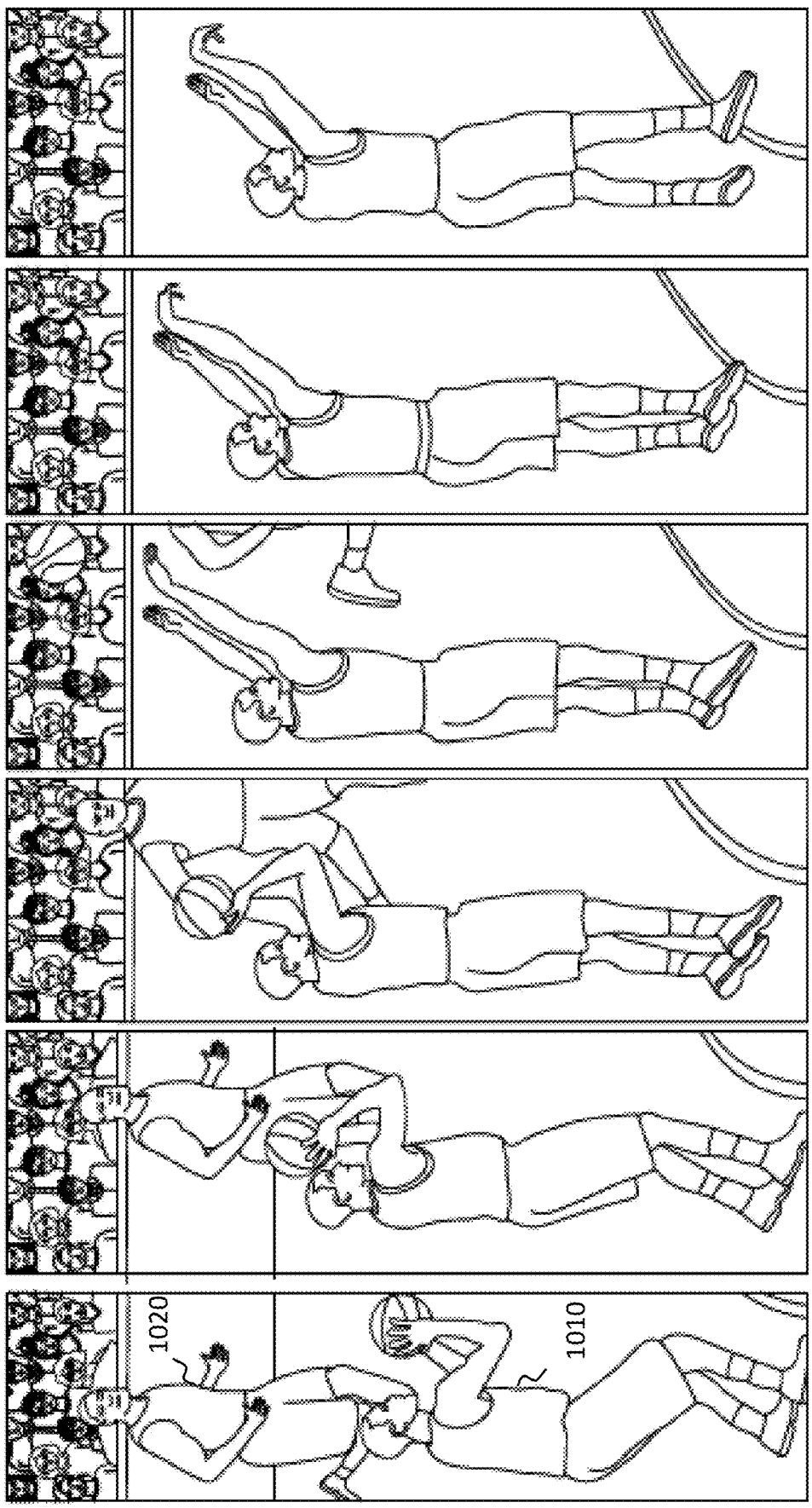
FIG. 10 is an example of a moving target object, such as a person, that is displayed in the livestream and is to be replaced, in accordance with some embodiments of the disclosure.

Once the scene description has been computed, processed, and analyzed, at block 102, a target object within the scene description that is to be replaced is identified. As depicted in image at block 101, in one embodiment, the scene description may relate to a studio, in which, in this embodiment, a woman is displaying a women's top S1 in the livestream. Although the livestream may include a plurality of objects, such as other shirts or women's tops hanging on a clothing or coat rack, a wall clock, a plant, and a sofa, the focus of the livestream may be for the woman to showcase the women's top S1 and market it to the audience who may be potential customers. Accordingly, the target object in this livestream may be the women's top S1. In another embodiment, although a livestream may include a plurality of moving objects, such as players in an NBA game, the target object (or person) identified and selected may be a player, such as Stephen Curry, shooting the ball as depicted in FIG. 10. In other words, only one, two, or a handful of objects from the scene description, which includes a plurality of objects, may be identified and selected as target object(s).

For a system or a user to identify one or more target objects for selection, in some embodiments, any one or more of the target object identification factors may be used. These target object identification factors, on which identification may be based, may include a) e-commerce history, b) identification based on user profile, c) machine learning pattern, such as browsing history, etc., d) audio input, e) visual input, such as a camera input, f) social media posts, g) data obtained from emails or texts, and h) any other metadata that indicates likelihood of user interest in the target object. Although a few factors have been identified, the embodiments are not so limited, and any other identification or selection factor generated by the system or user, such as selection factors depicted in FIG. 9, may also be applied to identify and select the target object(s).

In some embodiments, the target object may be identified and selected based on an identification factor that relates to e-commerce history. In this embodiment, the control circuitry 200 and/or 228 may access (or already have access to) an e-commerce account(s) of the user through which the user that is consuming the livestream has shopped previously. For example, these accounts may be on e-commerce sites such as Amazon™, Walmart™, eBay™, Target™, Gap™, NBA store™, Nike™, Macys™, etc. The access may include previously purchased products as well as products saved on a wish list, a save-for-later list, or another such type of list in which products have been identified by the user for later purchase or price monitoring. Once access to the e-commerce account of the user is obtained, since metadata related to prior purchases and a saved wish list can be accessed, the control circuitry 200 and/or 228 may identify a target object based on such e-commerce account data. For example, if a livestream is displaying Nike shoes, such as Air Jordans™, the control circuitry 200 and/or 228 may access the user's accounts on e-commerce sites and determine whether the user has previously purchased Nike shoes or specifically Air Jordans or saved it on their wish list for later purchase. If a determination is made that the user has previously purchased a Nike shoe or an Air Jordans or saved it in their wish list for later purchase, the control circuitry 200 and/or 228 may identify the currently presented Nike shoes in the livestream as a target object since they are related to a prior purchase or to a wish list associated with the user. The control circuitry 200 and/or 228 may either automatically select the currently presented Nike shoes in the livestream as a target object or may identify it and select them upon user approval.

In another embodiment, relating identification of a target object for selection based on the e-commerce history, once a determination is made that a currently displayed object in the livestream is related to the user's e-commerce history, the control circuitry 200 and/or 228 may notify the user that the currently displayed object is related to a prior purchase or a wish list. The control circuitry 200 and/or 228 may also notify the user of any updates or differences between the prior purchase or item on a wish list and the currently displayed object in the livestream. For example, the control circuitry 200 and/or 228 may provide a notification that the currently displayed object in the livestream is an updated version of the previously bought (or saved) product, such as a newer version of Nike Air Jordan. The control circuitry 200 and/or 228 may also provide key differences of a side-by-side comparison of the currently displayed object in the livestream and the previously bought (or saved) product. The control circuitry 200 and/or 228 may also crowdsource and access reviews and comments from the e-commerce site or other users that have purchased the currently displayed object in the livestream relating to the older and the newer, updated product. Such reviews may provide information to the user that relates to the updates of the product since the last purchase and what others have commented on such updates.

In yet another embodiment, relating identification of a target object for selection based on the e-commerce history, a slew of products may be sequentially presented on the channel that is being used to display the livestream. Since the control circuitry 200 and/or 228 may have access to which products are being presented next, the control circuitry 200 and/or 228 may determine which products to identify as target products based on the user's e-commerce history prior to such products being presented. For example, a sequence of products to be presented in the livestream may be 1) Air Jordans, 2) a Coach purse, 3) a microwave oven, 4) an NBA Warriors jersey, and 5) a set of bedsheets. In this example, the Air Jordans are currently being presented but other products are in the pipeline and have not yet been presented. If the control circuitry 200 and/or 228 determines that Air Jordans and an NBA Warriors jersey were previously bought (or saved on wish list) by the user, then the control circuitry 200 and/or 228 may select the Air Jordans and preselect the NBA Warriors jersey prior to being shown in the livestream as target objects.

In another embodiment, the target object may be identified and selected based on the identification factor that relates to the user profile. In this embodiment, the control circuitry 200 and/or 228 may access the user's profile and analyze any saved data in the user profile that may be used in determining user interest in an object being displayed in the livestream. If user interest in the object being displayed in the livestream is detected based on an analysis of the user profile data, then the object may be identified as a target object.

In another embodiment, the target object may be identified and selected based on an identification factor that relates to a machine learning pattern, such as browsing history etc. In this embodiment, the control circuitry 200 and/or 228 may invoke a machine learning (ML) engine running an ML algorithm to detect the user's patterns. These patterns may include the user's internet browsing pattern; speech pattern, such as during phone calls; social media posts or likes patterns; or any other pattern that may be accessed through data from electronic devices used by the user. Based on a pattern detected, the control circuitry 200 and/or 228 may determine user interest in an object or a genre related to an object and accordingly identify a target object that is within the user's interest.

In another embodiment, the target object may be identified and selected based on the identification factor that relates to audio input. The audio input may from the livestream and used to identify and select the target object or it may from a user consuming the livestream and used to select the target object. When the audio is from the livestream, such as from a host or presenter of the livestream, such audio may be analyzed to identify the target object. For example, if the host/presenter utters, "The blue sweater I am showing is on sale," then the control circuitry may determine based on the host/presenter's speech that the product being showcased currently is the blue sweater and identify it as a potential target object. As will be described later, if the control circuitry determines that the potential target object is of interest to the consuming user, then it may select it as a target object and perform further processing. On the other hand, if the control circuitry determines that the potential target object is not of interest to the consuming user, then the potential target object may not be selected as the target object.

The host/presenter's speech may also indicate what product will be shown next. For example, the host/presenter may utter, "Next I will be showing a beige Gucci bag to pair with this blue sweater." The control circuitry, based on the speech, may pre-detect the beige Gucci bag before it is displayed and identify it as a potential target object. As will be described in more detail below, the control circuitry may also cache a 3D model of the Gucci bag prior to its display in the livestream.

With respect to using the consuming user's speech, the control circuitry 200 and/or 228 may access user speech during the livestream, such a via microphone, and determine if the user is interested in the product being presented in the livestream. For example, if the user consuming the livestream audibly makes comments that can be interpreted as user interest, then the control circuitry 200 and/or 228 may identify a target object that is within the user's interest.

In another embodiment, the target object may be identified and selected based on an identification factor that relates to visual input. In this embodiment, the control circuitry 200 and/or 228 may access a camera during the livestream, such as a camera of the laptop or mobile phone used to consume the livestream or another IoT camera that has the user in its field of view. Accessing the camera, the control circuitry 200 and/or 228 may analyze user expression, gestures, and any other visual input and determine if such a visual input can be associated with user interest in the product being presented in the livestream. For example, if the user's eye widens or sparkles with excitement, the user smiles, or the user gives a physical thumbs-up, such gestures and expressions, may be analyzed by an artificial intelligence (AI) engine executing an AI algorithm to determine user interest, if user interest is determined, then the control circuitry 200 and/or 228 may identify the object as a target object that is within the user's interest.

In another embodiment, the target object may be identified and selected based on an identification factor that relates to social media posts. In this embodiment, the control circuitry 200 and/or 228 may access user's social media posts and analyze the posts to determine whether the object being displayed in the livestream would be of user interest. For example, the user may have commented on or liked a similar product, the same genre of products, etc., on social media. Accordingly, if user interest is determined based on such social media interaction by the user, then the control circuitry 200 and/or 228 may identify the object as a target object that is within the user's interest.

In another embodiment, the target object may be identified and selected based on an identification factor that relates to emails or texts. Similar to social media posts and likes, the control circuitry 200 and/or 228 may access the user's emails and text messages and determine based on data obtained from them whether the user may have an interest in the object being displayed in the livestream. If user interest is determined based on the user's emails and texts, then the control circuitry 200 and/or 228 may identify the object as a target object that is within the user's interest.

In another embodiment, the target object may be identified and selected based on the identification any other factor that relates to other metadata that indicates likelihood of user interest in the target object. Since there may be several objects displayed in the livestream, in the embodiments described above, the control circuitry 200 and/or 228 may further determine whether the object identified in an object that is being sold via the livestream. If it is not an object being sold, even if there is user interest in that object, the control circuitry 200 and/or 228 may not select such an object as a target object.

Figure 11:
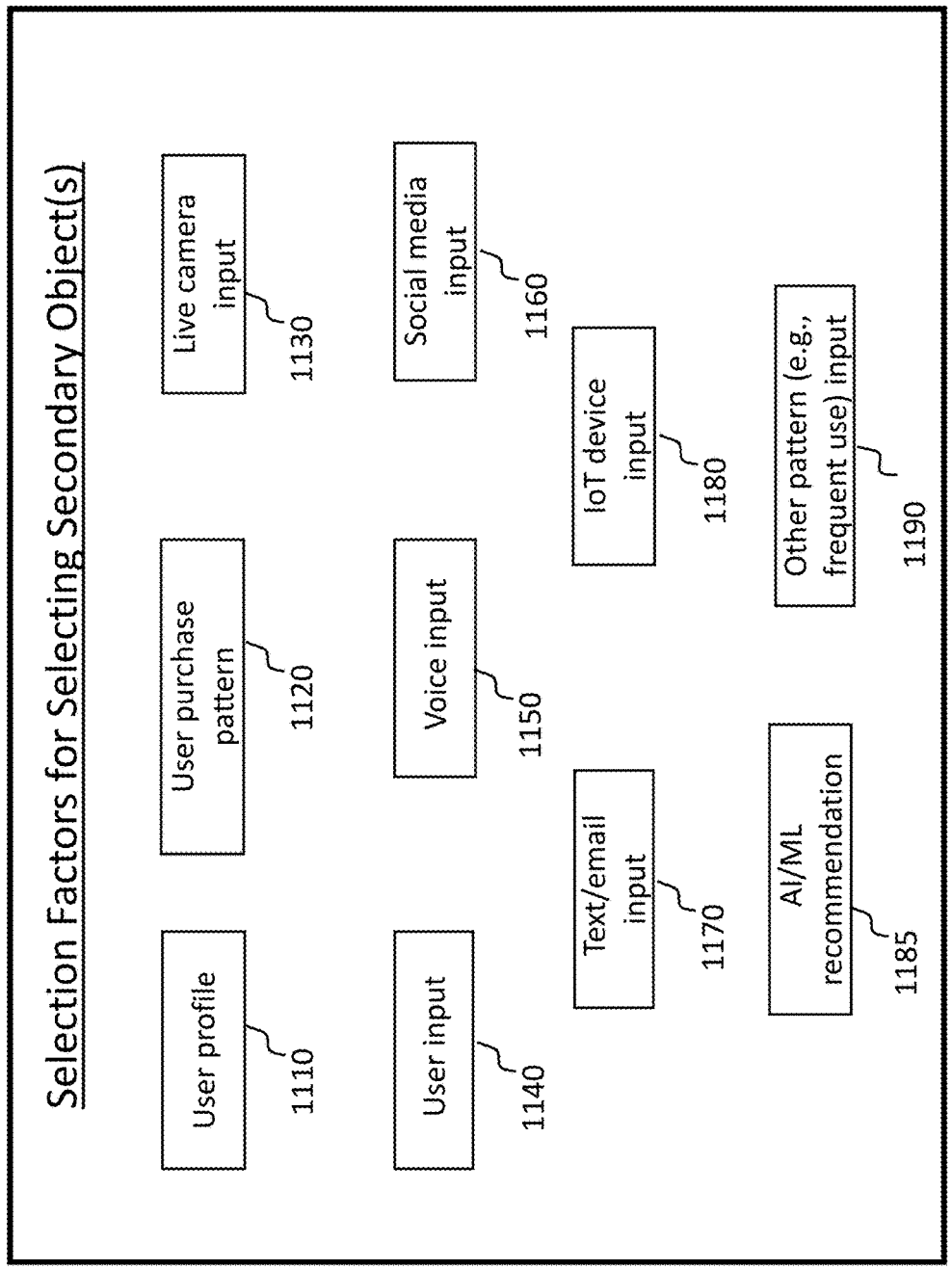
FIG. 11 is a block diagram of selection factors for selecting a secondary object(s), in accordance with some embodiments of the disclosure.

At block 103, once a target object has been identified and selected, whether it is by the system or the user, the control circuitry 200 and/or 228 may select a secondary object to replace the identified target object. For a system or a user to select one or more secondary objects for selection, in some embodiments, any one or more of the secondary object selection factors as depicted in FIG. 11 may be used. The secondary object selected, in some embodiments, may be contextually or semantically related to the selected target object. The secondary object selected, in some embodiments, may share at least one attribute with the target object. In some embodiments, the attributes of the target object may include color, texture, size, and price. In other embodiments, when the target object is a person, the attribute may include height, measurement, size, weight, compulsion, built, and other physical features of the person. These attributes may just be retrieved after the target object is identified. The secondary object selected, in some embodiments, may also be in the same genre as the selected target object. For example, if the selected target object is a shoe, then the secondary object may also be a shoe. In some broader applications, if the selected target object is a shoe, then the secondary object may at least be in the same genre, i.e., footwear. Accordingly, the secondary object may be shoe, sandal, boots etc.

Since the selection of the secondary object is made to personalize the target object to the user that is consuming the livestream, secondary objects that are not related to the target object, secondary objects that do not share at least one common attribute or shared attribute with the target object, or not in the same genre or bear any other type of relationship with the target objects may not be selected as secondary objects. For example, if the selected target object is a shoe, then the secondary object may not be a beer or a laptop since such secondary objects bear no relationship to the selected target object. As described above, since the selection of the secondary object is made to personalize the target object, some examples of secondary objects may include selection of a larger size of same object as the selected target object, a different color or texture of same object as the selected target object, a newer model of the same object as the selected target object, a customized fit for the user of the same apparel as the selected target object, an NBA player of the same height as selected target object (e.g. another NBA player) etc.

For example, as depicted in one example at blocks 101-103, if a target object selected in a women's top S1 in block102, then a secondary object that is personalized to the consuming user, such as women's top with polka dots depicted in block 103, may be selected as the secondary object to replace the target object. Further details relating to selection of secondary objects based on various factors is described below in the description related to FIG. 11.

At block 104, a three-dimensional (3D) model of the selected target object is obtained. In some embodiments, a 3D model of the target object may not be available and as such may have to be generated. In such embodiment, the control circuitry 200 and/or 228 may use one of many techniques to generate the 3D model. In one embodiment, the technique used may be to leverage many 2D video frames in the received livestream as photogrammetry images to build the 3D model over time. Further details relating to the photogrammetry technique is described below in the description related to FIG. 12. Other 3D synthesis techniques involving capturing of the volume of the target object using multiple cameras to then synthesize the volume to generate the 3D model may also be used.

In some embodiments, the 3D model of not only the target object, but also the scene description, may be needed for replacing the target object with the secondary object. This is because the target object may have a semantic relationship with other objects in the scene description. The spatial location of the target object may also have some association with other objects in the scene description. As such, in some embodiments, in order to replace the target object properly and seamlessly with the secondary object and provide the visual appearance of the secondary object fitting and blending into the scene (just as the target object blended into the scene), knowledge of the surroundings may be needed. For example, if the target object in the original scene description cast a shadow on another object, understanding the length and opacity of the shadow and the lighting used may be needed. In another example, if the target object was structurally supported by another object in the scene description, understanding the structural relationship may be needed. In yet another example, if the target object is moving in relation to another moving object in the scene, understanding of such movement relationship may be needed. In other words, in order to blend the secondary object into the same scene description, a complete understanding of the surroundings may be needed. Such an understanding may allow the system to place the secondary object, using the example above, in such a way that it casts the same shadow, has the same structural relationship, and moves in a same movement relationship as the target object did in the original scene description. To obtain such understanding, a 3D model of the scene description may be needed.

At block 105, the control circuitry 200 and/or 228 may determine a replacement option for replacing the target object with the secondary object. The replacement options may include inpainting the scene description such that the inpainting results in the replacement of the target object with the secondary object. The replacement options may also include overlaying the secondary object on the target object in the scene description. The replacement options may further include modifying pixels associated with the scene description such that the modification results in replacement of the target object with the secondary object. In addition to these exemplary replacement techniques, any other replacement techniques, such as an AI technique to replace the target object with the secondary object, may also be used.

In some embodiments, once a replacement is done, the control circuitry may revert to the original livestream with the target object if the user is not satisfied with the replacement. The control circuitry may also revert to the original livestream with the target object if the system detects that the quality of replacement is not above a predetermined quality threshold.

At block 106, image processing may be performed with the secondary object to replace the target object with the secondary object based on the replacement option selected at block 105. The image processing, in some embodiments, may include orientation mapping, scene illumination, shadow detection and shadow mapping, and color and texture processing.

Orientation mapping, in some embodiments, comprises mapping the orientation of the secondary object to the orientation of the target object prior to the replacement. To do so, the control circuitry 200 and/or 228 may obtain the orientation of the target object from metadata data sets associated with the scene description. If so, the control circuitry 200 and/or 228 may determine the orientation of the target object on the 3D model generated (or obtained). The control circuitry 200 and/or 228 may also generate a 3D model of the secondary object or obtain one if it already exists. Then, during the replacement of the target object with the secondary object, the control circuitry may apply the same orientation of the secondary object from its 3D model to the orientation of the target object from its 3D model.

In some embodiments, the target object may be a moving object, such as the NBA player in FIG. 10. When the target object is a human who is moving, or another moving object, such as a car or an animal or any other moving object, the control circuitry 200 and/or 228 may compute the current position and orientation of the NBA player and predict his next position and orientation. For example, if the target object is an NBA player and the NBA player is moving towards the basketball hoop, the control circuitry 200 and/or 228 may then predict his next position and orientation, which may be a next step or a few steps along the same path and close to the basketball hoop. Once the next few frames are predicted, the control circuitry 200 and/or 228 may, using the predicted position and orientation, pulls up the corresponding position and orientation of the secondary object from its 3D model proactively before the replacement operation and then replace the secondary object in the predicted position. Performing such a prediction and proactive replacement at the predicted position may provide for a smooth and seamless replacement operation. Such replacement may also provide image continuity such that a gap in the image does not occur.

In some embodiments, the target object may be a garment that may be worn by a person in the livestream. As such, the secondary object that will replace the target object (the garment) may also need to be fitted on the person in the livestream. To do so, the control circuitry may obtain the pose parameters of the person and any additional parameters needed to properly fit the secondary object onto the person when replacing the target object. These parameters may include the orientation and voxels associated with the person. The control circuitry may also obtain images or 2D video frames of the person wearing the target object from a plurality of angles that are sufficient for generating a 3D model. Since the target object in these embodiments has a touch point to the person, the control circuitry may also create a semantic connection (annotated if/when necessary) between the target object (garment) and the person and keep the same association during the replacement process during the re-rendering.

Based on the obtained parameters and the 2D video frames, the control circuitry may generate a 3D model of the person. The control circuitry may then estimate the body shape based on the generated 3D model. In that regard, the control circuitry may also estimate the person's attributes or measurements, such as the person's height, trunk height, shoulder width, chest wirth, waist width, waist girth, and hip wirth. In other embodiments, these attributes may just be retrieved after the target object is identified. The control circuitry may then compute the relevant fitting X, Y, Z parameters of the secondary object that is to replace the target object. Since the target object is a garment which conforms to the shape of the person wearing the garment and has various deformations, which are typical for cloth, the control circuitry may also perform shape alignment and deformation on the secondary object.

In order to obtain a better fit of the secondary object on the person and replace the target object, the control circuitry may use the geometry data, texture data, and moving pose/ motion trajectory to optimize the shape alignment of the secondary object on the person. Taking into consideration the geometry data, texture data, and moving pose/motion trajectory allows the secondary object to fit the person properly and accurately as the target object did prior to the replacement. If the fit is not perfect, or above a predetermined threshold, then the control circuitry may invoke a post processing inpainting step to cure any defects and ensure proper fit as well as ensure that the final rendering does not overwrite/delete any other objects or its point cloud in the livestream.

The control circuitry may use this process (i.e., when a garment is the target object) to provide a consuming user an option to visualize the garment on the person in a different size, color, or texture shown, that is personalized for the user. For example, if the user consuming the livestream wears an XXL and the livestream garment is shown in a small size, then the process may be used to replace the target object that is shown in small size with an XXL that is fitted to the person in the livestream.

Referring to the image processing, in some embodiments, as described earlier, scene illumination, shadow detection and shadow mapping, and color and texture processing may also be performed to provide the secondary object with the same illumination, shadow, color and texture as the original target object. If the secondary object is the same object in a different color or texture, then the new color or texture is used to replace the target object.

In some embodiments, once the image processing described above is completed, the scene may be re-rendered with the secondary object in real-time, or relatively real-time with some reasonable time lag (as illustrated, e.g., in FIG. 14A), such as an acceptable predetermined time lag that is based on system processing capabilities.

In other embodiments, the image processing to the secondary object may be performed to re-render the scene in a time-shifted manner. This embodiment may be invoked based on a determination that the image processing required to replace the target object with the secondary object is more complex and requires additional processing time, e.g., processing time and computational resources above a predetermined threshold. As such, the control circuitry 200 and/or 228 may perform the image processing in the background while the livestream continues to run and display the replaced scene with the secondary object in a time-shifted manner that would allow the user to scroll back and play the livestream. The control circuitry 200 and/or 228 may also display the time-shifted rendering of the replaced secondary object in other formats, such as picture-in-picture or as a marker on a timeline for scrolling back. Further details relating to such time-shifting and its presentation to the user are described below in the description related to FIGS. 14B and 14C.

In some embodiments, the process of replacing the target object using a replacement option selected in block 105 and performing the image processing of block 106 includes performing a 2D-to-3D and then back to 2D conversion. In these embodiments, the first 2D-to-3D conversion is to generate a 3D model of the scene description from a plurality of 2D images. This is the 3D model of the scene description in its original state, i.e., the scene description with the target object. As described earlier, this may be performed by leveraging many 2D video frames in the received livestream as photogrammetry images to build the 3D model over time, given that the camera orientation provides us enough angles to work with. This 3D model is generated to ensure that when the target object is replaced by the secondary object, the secondary object blends into the scene the same way the target object did prior to the replacement. Since a scene may have several 3D effects, such as an effect of lighting and shadow, depth perception effect, foreground, and background relationships between objects and related effects, obtaining such 3D model aids in ensuring all such 3D effects for the secondary object are matched to the original scene containing the target object.

Once the 3D model of the original scene description that includes the target object is generated, it may be used for replacing the target object with the secondary object. The generated 3D model of the scene description, which includes the 3D model of the target object, allows the system to make the scene and the objects in the scene fully editable after import. Such full editing capability includes being able to scale, rotate, and light the scene or any object within the scene. To generate the 3D model, the control circuitry 200 and/or 228 leverages two sets of metadata branches that are obtained from the scene description. These two metadata branches include the geometry branch and the texture branch. In some embodiments, the geometry branch is used to generate a polygon mesh with any desired topology, and the texture branch is used to generate a texture field that can represent colors and, for example, specific materials at the surface points of the polygon mesh. Information from these two sets of metadata due to their 3D nature provides information relating to what objects are in the foreground versus background, such as via data that relates to depth maps.

The 3D model generated may also be updated periodically. In some embodiments, as the control circuitry 200 and/or 228 receives the video frames during the live video stream, the control circuitry 200 and/or 228 keeps updating the 3D model as objects in the scene description change or as camera angles change.

In some embodiments, rather than generating a 3D model from 2D images using generative neural network models or the photogrammetry approach describe above, the control circuitry may collect depth information from the camera itself (if available) and convey that to a cloud server. This information can then be leveraged for generating the 3D model. The control circuitry may use data from multiple cameras (like Intel RealSense) if they are present, to automate semantic understanding of the scene description by using a deformation graph that will be generated for non-rigid target objects.

In yet other embodiments, a light field camera may be used to capture the livestream and secondary object. Using the light field camera may greatly reduce the target object replacement process since there may be no need to generate a 3D model. Instead, the control circuitry may create a direct mapping between the target object and the secondary object. Using the light field camera may also alleviate the need for the scene illumination since the light field camera may also be used to capture the secondary object and as such may be able to directly manipulate the lighting parameters with ease after capturing the secondary object by leveraging the illumination parameters.

At block 107, in some embodiments, once the re-rendering is performed, scalability options and quality checks may be analyzed and explored. In other embodiments, scalability options and quality checks may be analyzed and explored prior to rendering the final image with the replaced secondary object.

The scalability options may include performing the livestream's personalization for several client devices at a time, such as tens, hundreds, or thousands of client devices. In some embodiments, some of the scalability options that may be implemented include a) pre-loading and pre-caching 3D models, b) communicating only the modifications and not the entire scene, c) adapting processing based on the complexity of the image, and d) performing processing in the cloud. Although some scalability options are discussed, the embodiments are not so limited and other scalability options that lead to a more efficient system for streaming a personalized livestream from one host to many client devices are also contemplated. For example, such efficient processes may include grouping a plurality of individuals with similar preferences and transmitting a single personalized modification to the group. Edge devices that may be associated with individuals within a location, such as a neighborhood or a city, may be used to perform some part of the processing in order to share the processing load.

With respect to pre-loading and pre-caching 3D models and communicating only the modifications and not the entire scene, in some embodiments, image processing may be performed on the client device. In these embodiments, since information from the host relating to which products will be displayed in the livestream may be available prior to their display, the control circuitry 200 and/or 228 may pre-load and pre-cache all the 3D models of the product and its variations on the client side at the beginning of the stream. In some embodiments, the control circuitry 200 and/or 228 may divide the initial computation of the scene description (as depicted in block 101) and replacement (as depicted in block 105) on the cloud side (or on an edge node) and communicate the scene description with the replacement, such as via a. USD or another type of file, to the client. After the scene description with the replacement has been communicated, only the scene modifications may be communicated to the client for it to refresh its scene with the detected changes. In some embodiments when the livestream is hosted in a confined setting, such as a studio, shop, or home, then a majority of the background may not change. For example, in block 101, a background includes a coat or clothing rack, a plant, a sofa, and a wall clock. As such, when transmitting the livestream to a plurality of client devices, only the modification, which may be a personalized women's top instead of the S1 that may vary from one client device to another based on different secondary object selection factors (as discussed in relation to FIG. 11), may be transmitted to the client devices instead of the whole scene. The client devices on their end may only insert those replaced secondary objects into the 3D scene and not have to compute the entire scene description which includes other objects such as the coat or clothing rack, the plant, the sofa, and the wall clock that are fairly stationary. Accordingly, client-side processing may be limited to, and made more efficient by, performing just the replacement operation and re-rendering of the scene thereby significantly reducing the processing load on the client to perform the replacement operation in real-time or a quick manner. Although cloud processing is described in this embodiment, the process may also be on an edge node as they are deployed and become available over time.

With respect to adapting processing based on the complexity of the image and performing processing in the cloud, the control circuitry 200 and/or 228 may determine whether to use cloud services, edge devices, or client devices to perform image and replacement processing. To do so, the control circuitry 200 and/or 228 may first determine the complexity of the replacement. This may include determining characteristics of the target object; whether the target object is within a confined space, such as a studio, house, store etc., or is a moving object, such as the NBA player; and whether the replacement requires image processing that would require higher computational resources and processing power, etc. For example, in an example of a replacement where the target object is a women's top shown in a confined space, such as in block 101, and the replacement secondary object is the same or a similar women's top with the only change being that it has a different color, texture, or size than the target object, then based on the simpler replacement process that requires a level of image processing and computational resources below a threshold, the control circuitry 200 and/or 228 may determine to perform the processing at the client device. On the flip side, the target object that is to be replaced may be the NBA player in FIG. 10 that is in motion, and the scene may have other moving components, such as the other player also moving alongside the NBA player. In such a scene, based on the complexity of the replacement due to several moving parts, which requires a level of image processing and computational resources above the threshold, the control circuitry 200 and/or 228 may determine to use cloud services or edge devices instead of the client devices to perform the image processing for the replacement.

In some embodiments, some of the quality related operation include determining whether the quality of the replaced secondary object in above a threshold quality. The quality determination may include, a) determining whether the replaced secondary object properly blends into the scene such that it provides the same appearance as that of the original target object, b) determining whether the angle, positioning, color gamut synchronization, and lighting of the secondary object matches that of the original target, c) whether the background or foreground of the space surrounding the target object needs to be changed to provide a more enhanced appearance, or d) whether the resolution of the frames used is of the highest quality. Along with these exemplary quality determinations, other quality related determinations may also be made to ensure that the replaced secondary object seamlessly fits into the scene description with at least the same quality as the target object prior to the replacement.

With respect to determining whether the replaced secondary object properly blends into the scene such that it provides the same appearance as that of the original target object, the control circuitry 200 and/or 228 may determine the semantic relationship between the target object and surrounding objects and the scene overall. The control circuitry 200 and/or 228 may also determine the pose of the target object if it's a person. The control circuitry 200 and/or 228 may also determine all the effects of the target object, such as its angle, positioning, and lighting etc. The control circuitry 200 and/or 228 may then compare the scene of the replaced secondary object with the scene of the target object to determine whether the replaced secondary object is at least the same quality as that of the original target object.

With respect to determining whether the background or foreground of the space surrounding the target object needs to be changed to provide a more enhanced appearance, the control circuitry 200 and/or 228 may determine whether the color, texture, or location of other objects interfere with the quality of the rendered scene. For example, in the case of livestreaming, it is possible for the system to assess the quality of replacement, such as object segmentation, overlaying, inpainting, pixel modification, rendering, replacement, etc. The evaluation results at each stage can be used to provide feedback and suggestions to the host. For instance, if the host is wearing a black cloth while presenting a black bag, it may introduce unnecessary challenges in object segmentation or inpainting from the video. Accordingly, the control circuitry 200 and/or 228 may analyze such challenges and provide a suggestion to the host to change to a blue bag of same product or some other color or texture that minimizes the replacement challenges. Since any flaws in the replacement options selected, such as from the replacement options described at block 105, of a target object may impact the performance and quality of downstream processing of the target object, the control circuitry 200 and/or 228 may provide feedback notifications to the host to make changes to the environment such that a higher-quality rendering can be performed with the secondary object.

Figure 3:
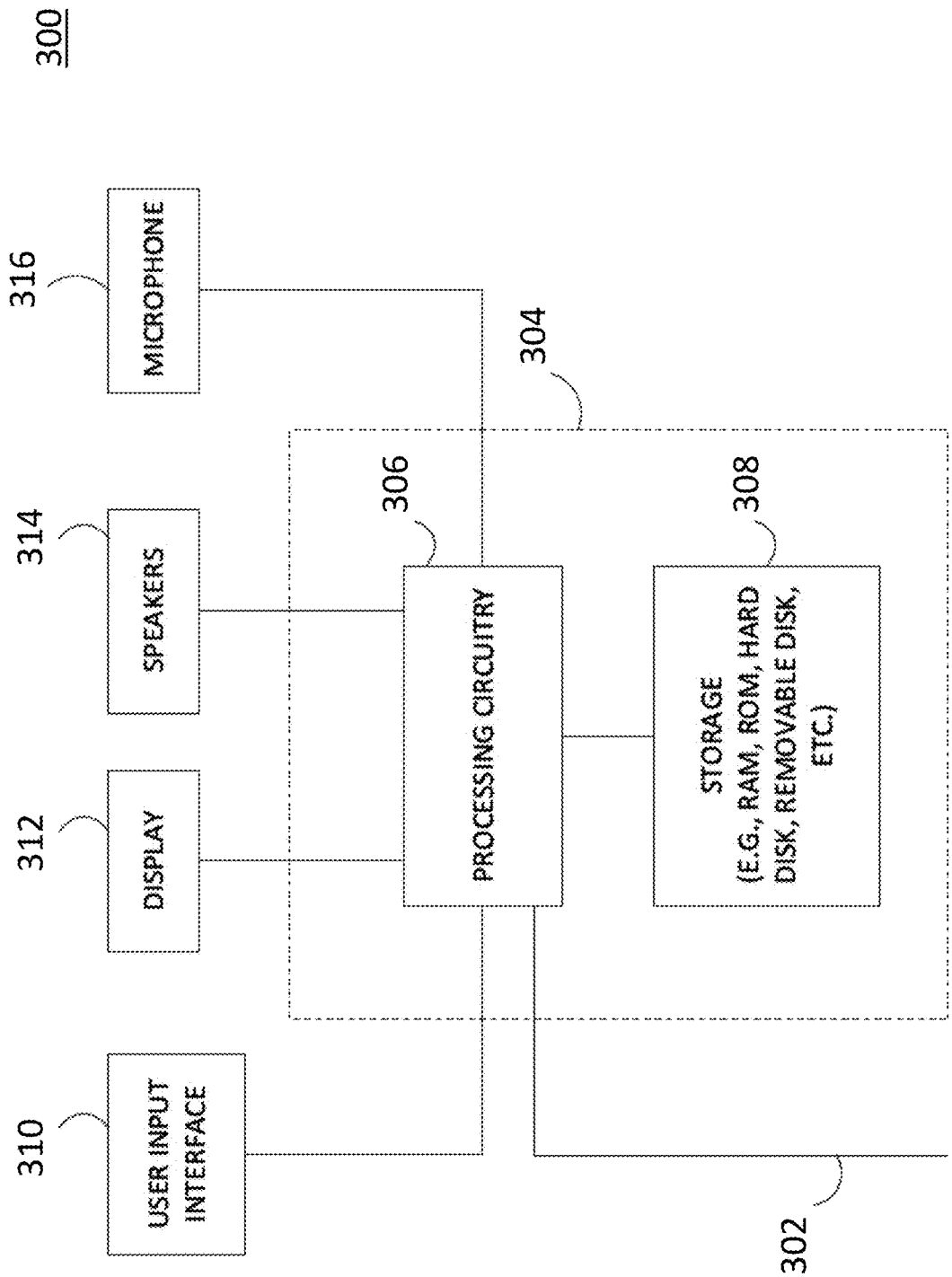
FIG. 3 is a block diagram of user device on which a livestream may be displayed, and replacement of the target object(s) may be performed, in accordance with some embodiments of the disclosure.

FIG. 2 is a block diagram of an example system for replacing the target object(s) in the livestream, in accordance with some embodiments of the disclosure. FIGS. 2 and 3 also describe example devices, systems, servers, and related hardware that may be used to implement processes, functions, and functionalities described at least in relation to FIGS. 1, 4-16. Further, FIGS. 2 and 3 may also be used at least for computing scene descriptions, determining relevance and importance of potential objects in the scene to then select one or more target objects, selecting secondary objects, determining relevance of secondary objects to target objects, obtaining 3D models of the live stream and the objects within the live stream, generating 3D models when 3D models are not available, using techniques like photogrammetry to generate the 3D models, selecting replacement options for replacing the target object with the secondary object, such as via overlaying, inpainting, modifying pixel, etc., performing image processing with the secondary object, live-rendering the scene with the replaced secondary object, rendering as a time-shifted display, performing post processing that may include determining scalability options and deploying them and enhancing quality of re-rendered scene, utilizing NLP, AI, and ML engines to execute associated algorithms for determining various solutions described herein, and performing functions related to all other processes and features described herein.

In some embodiments, one or more parts of, or the entirety of system 200, may be configured as a system implementing various features, processes, functionalities and components of FIGS. 1, and 4-16. Although FIG. 2 shows a certain number of components, in various examples, system 200 may include fewer than the illustrated number of components and/or multiples of one or more of the illustrated number of components.

System 200 is shown to include a computing device 218, a server 202 and a communication network 214. It is understood that while a single instance of a component may be shown and described relative to FIG. 2, additional instances of the component may be employed. For example, server 202 may include, or may be incorporated in, more than one server. Similarly, communication network 214 may include, or may be incorporated in, more than one communication network. Server 202 is shown communicatively coupled to computing device 218 through communication network 214. While not shown in FIG. 2, server 202 may be directly communicatively coupled to computing device 218, for example, in a system absent or bypassing communication network 214.

Communication network 214 may comprise one or more network systems, such as, without limitation, an internet, LAN, WIFI or other network systems suitable for audio processing applications. In some embodiments, system 200 excludes server 202, and functionality that would otherwise be implemented by server 202 is instead implemented by other components of system 200, such as one or more components of communication network 214. In still other embodiments, server 202 works in conjunction with one or more components of communication network 214 to implement certain functionality described herein in a distributed or cooperative manner. Similarly, in some embodiments, system 200 excludes computing device 218, and functionality that would otherwise be implemented by computing device 218 is instead implemented by other components of system 200, such as one or more components of communication network 214 or server 202 or a combination. In still other embodiments, computing device 218 works in conjunction with one or more components of communication network 214 or server 202 to implement certain functionality described herein in a distributed or cooperative manner.

Computing device 218 includes control circuitry 228, display 234 and input circuitry 216. Control circuitry 228 in turn includes transceiver circuitry 262, storage 238 and processing circuitry 240. In some embodiments, computing device 218 or control circuitry 228 may be configured as electronic device 300 of FIG. 3.

Server 202 includes control circuitry 220 and storage 224. Each of storages 224 and 238 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 224, 238 may be used to store various types of content (e.g., scene description, 3D models of target and secondary objects, user preferences and profile, metadata associated with target and secondary objects, e-commerce history of a user, live stream videos, and AI and ML algorithms). Non-volatile memory may also be used (e.g., to launch a boot-up routine, launch an app, render an app, and other instructions). Cloud-based storage may be used to supplement storages 224, 238 or instead of storages 224, 238. In some embodiments, data relating to scene description, 3D models of target and secondary objects, user preferences and profile, metadata associated with target and secondary objects, e-commerce history of a user, live stream videos, and AI and ML algorithms, and data relating to all other processes and features described herein, may be recorded and stored in one or more of storages 212, 238.

In some embodiments, control circuitries 220 and/or 228 executes instructions for an application stored in memory (e.g., storage 224 and/or storage 238). Specifically, control circuitries 220 and/or 228 may be instructed by the application to perform the functions discussed herein. In some implementations, any action performed by control circuitries 220 and/or 228 may be based on instructions received from the application. For example, the application may be implemented as software or a set of executable instructions that may be stored in storage 224 and/or 238 and executed by control circuitries 220 and/or 228. In some embodiments, the application may be a client/server application where only a client application resides on computing device 218, and a server application resides on server 202.

The application may be implemented using any suitable architecture. For example, it may be a stand-alone application wholly implemented on computing device 218. In such an approach, instructions for the application are stored locally (e.g., in storage 238), and data for use by the application is downloaded on a periodic basis (e.g., from an out-of-band feed, from an internet resource, or using another suitable approach). Control circuitry 228 may retrieve instructions for the application from storage 238 and process the instructions to perform the functionality described herein. Based on the processed instructions, control circuitry 228 may determine a type of action to perform in response to input received from input circuitry 216 or from communication network 214. For example, the control circuitry 228, in response to identifying a target object, select a secondary object that is relevant to the target object and is likely to be of interest to the user based on their previous purchase history. The control circuitry 228 may also perform steps of processes described in FIGS. 1, 4-16.

In client/server-based embodiments, control circuitry 228 may include communication circuitry suitable for communicating with an application server (e.g., server 202) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 214). In another example of a client/server-based application, control circuitry 228 runs a web browser that interprets web pages provided by a remote server (e.g., server 202). For example, the remote server may store the instructions for the application in a storage device. The remote server may process the stored instructions using circuitry (e.g., control circuitry 228) and/or generate displays. Computing device 218 may receive the displays generated by the remote server and may display the content of the displays locally via display 234. This way, the processing of the instructions is performed remotely (e.g., by server 202) while the resulting displays, such as the display windows described elsewhere herein, are provided locally on computing device 218. Computing device 218 may receive inputs from the user via input circuitry 216 and transmit those inputs to the remote server for processing and generating the corresponding displays. Alternatively, computing device 218 may receive inputs from the user via input circuitry 216 and process and display the received inputs locally, by control circuitry 228 and display 234, respectively.

Server 202 and computing device 218 may transmit and receive content and data such as scene description. Control circuitry 220, 228 may send and receive commands, requests, and other suitable data through communication network 214 using transceiver circuitry 260, 262, respectively. Control circuitry 220, 228 may communicate directly with each other using transceiver circuits 260, 262, respectively, avoiding communication network 214.

It is understood that computing device 218 is not limited to the embodiments and methods shown and described herein. In nonlimiting examples, computing device 218 may be an electronic device, a personal computer (PC), a laptop computer, a tablet computer, a WebTV box, a personal computer television (PC/TV), a PC media server, a PC media center, a handheld computer, a mobile telephone, a smartphone, a mixed reality device, or any other device, computing equipment, or wireless device, and/or combination of the same that is capable of performing the embodiments disclosed herein.

Control circuitries 220 and/or 218 may be based on any suitable processing circuitry such as processing circuitry 226 and/or 240, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitries 220 and/or control circuitry 218 are configured for computing scene descriptions, determining relevance and importance of potential objects in the scene to then select one or more target objects, selecting secondary objects, determining relevance of secondary objects to target objects, obtaining 3D models of the live stream and the objects within the live stream, generating 3D models when 3D models are not available, using techniques like photogrammetry to generate the 3D models, selecting replacement options for replacing the target object with the secondary object, such as via overlaying, inpainting, modifying pixel, etc., performing image processing with the secondary object, live-rendering the scene with the replaced secondary object, rendering as a time-shifted display, performing post processing that may include determining scalability options and deploying them and enhancing quality of re-rendered scene, utilizing NLP, AI, and ML engines to execute associated algorithms for determining various solutions described herein, and performing functions related to all other processes and features described herein.

Computing device 218 receives a user input 204 at input circuitry 216. For example, computing device 218 may receive data relating to a user preference for a secondary object.

Transmission of user input 204 to computing device 218 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 216 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 240 may receive input 204 from input circuit 216. Processing circuitry 240 may convert or translate the received user input 204 that may be in the form of voice input into a microphone, or movement or gestures to digital signals. In some embodiments, input circuit 216 performs the translation to digital signals. In some embodiments, processing circuitry 240 (or processing circuitry 226, as the case may be) carries out disclosed processes and methods. For example, processing circuitry 240 or processing circuitry 226 may perform processes as described in FIGS. 1, 4-16, respectively.

FIG. 3 is a block diagram of user device on which a livestream may be displayed, and replacement of the target object(s) may be performed, in accordance with some embodiments of the disclosure. In an embodiment, the equipment device 300, is the same equipment device 202 of FIG. 2. The equipment device 300 may receive content and data via input/output (I/O) path 302. The I/O path 302 may provide audio content. The control circuitry 304 may be used to send and receive commands, requests, and other suitable data using the I/O path 302. The I/O path 302 may connect the control circuitry 304 (and specifically the processing circuitry 306) to one or more communications paths or links (e.g., via a network interface), any one or more of which may be wired or wireless in nature. Messages and information described herein as being received by the equipment device 300 may be received via such wired or wireless communication paths. I/O functions may be provided by one or more of these communications paths or intermediary nodes but are shown as a single path in FIG. 3 to avoid overcomplicating the drawing.

The control circuitry 304 may be based on any suitable processing circuitry such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 or 19 processor).

In client-server-based embodiments, the control circuitry 304 may include communications circuitry suitable for computing scene descriptions, determining relevance and importance of potential objects in the scene to then select one or more target objects, selecting secondary objects, determining relevance of secondary objects to target objects, obtaining 3D models of the live stream and the objects within the live stream, generating 3D models when 3D models are not available, using techniques like photogrammetry to generate the 3D models, selecting replacement options for replacing the target object with the secondary object, such as via overlaying, inpainting, modifying pixel, etc., performing image processing with the secondary object, live-rendering the scene with the replaced secondary object, rendering as a time-shifted display, performing post processing that may include determining scalability options and deploying them and enhancing quality of re-rendered scene, utilizing NLP, AI, and ML engines to execute associated algorithms for determining various solutions described herein, and performing functions related to all other processes and features described herein.

The instructions for carrying out the above-mentioned functionality may be stored on one or more servers. Communications circuitry may include a cable modem, an integrated service digital network (ISDN) modem, a digital subscriber line (DSL) modem, a telephone modem, ethernet card, or a wireless modem for communications with other equipment, or any other suitable communications circuitry. Such communications may involve the internet or any other suitable communications networks or paths. In addition, communications circuitry may include circuitry that enables peer-to-peer communication of primary equipment devices, or communication of primary equipment devices in locations remote from each other (described in more detail below).

Memory may be an electronic storage device provided as the storage 308 that is part of the control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, or any other suitable fixed or removable storage devices, and/or any combination of the same. The storage 308 may be used to store various types of content, (e.g., scene description, 3D models of target and secondary objects, user preferences and profile, metadata associated with target and secondary objects, e-commerce history of a user, live stream videos, and AI and ML algorithms, and data relating to all other processes and features described herein). Cloud-based storage, described in relation to FIG. 3, may be used to supplement the storage 308 or instead of the storage 308.

The control circuitry 304 may include audio generating circuitry and tuning circuitry, such as one or more analog tuners, audio generation circuitry, filters or any other suitable tuning or audio circuits or combinations of such circuits. The control circuitry 304 may also include scaler circuitry for upconverting and down converting content into the preferred output format of the electronic device 300. The control circuitry 304 may also include digital-to-analog converter circuitry and analog-to-digital converter circuitry for converting between digital and analog signals. The tuning and encoding circuitry may be used by the electronic device 300 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 308 is provided as a separate device from the electronic device 300, the tuning and encoding circuitry (including multiple tuners) may be associated with the storage 308.

The user may utter instructions to the control circuitry 304, which are received by the microphone 316. The microphone 316 may be any microphone (or microphones) capable of detecting human speech. The microphone 316 is connected to the processing circuitry 306 to transmit detected voice commands and other speech thereto for processing. In some embodiments, voice assistants (e.g., Siri, Alexa, Google Home and similar such voice assistants) receive and process the voice commands and other speech.

The electronic device 300 may include an interface 310. The interface 310 may be any suitable user interface, such as a remote control, mouse, trackball, keypad, keyboard, touchscreen, touchpad, stylus input, joystick, or other user input interfaces. A display 312 may be provided as a stand-alone device or integrated with other elements of the electronic device 300. For example, the display 312 may be a touchscreen or touch-sensitive display. In such circumstances, the interface 310 may be integrated with or combined with the microphone 316. When the interface 310 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the interface 310 may be HDTV-capable. In some embodiments, the display 312 may be a 3D display. The speaker (or speakers) 314 may be provided as integrated with other elements of electronic device 300 or may be a stand-alone unit. In some embodiments, the display 312 may be outputted through speaker 314.

The equipment device 300 of FIG. 3 can be implemented in system 200 of FIG. 2 as primary equipment device 202, but any other type of user equipment suitable for allowing communications between two separate user devices for performing the functions related to implementing machine learning (ML) and artificial intelligence (AI) algorithms, and all the functionalities discussed associated with the figures mentioned in this application.

FIG. 4 is a block diagram of an example system for multicasting personalized secondary objects to different users during a livestream, in accordance with some embodiments of the disclosure. The system, in one embodiment, includes a presenter/host 410 using a camera 420 for filming a livestream. The livestream may then be transmitted via a cloud server 430 to a plurality of client devices 460-480. The cloud server may be communicatively connected to an application (e-commerce) site 440 that may have stored product inventory 445 and 3D models of target and secondary objects 450.

Figure 5A:
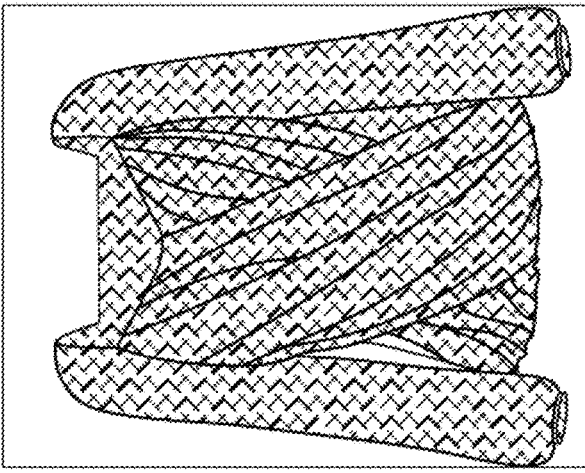
FIGS. 5A and 5B are prior art images in which static website images are replaced with static objects, in accordance with some embodiments of the disclosure.
Figure 5B:
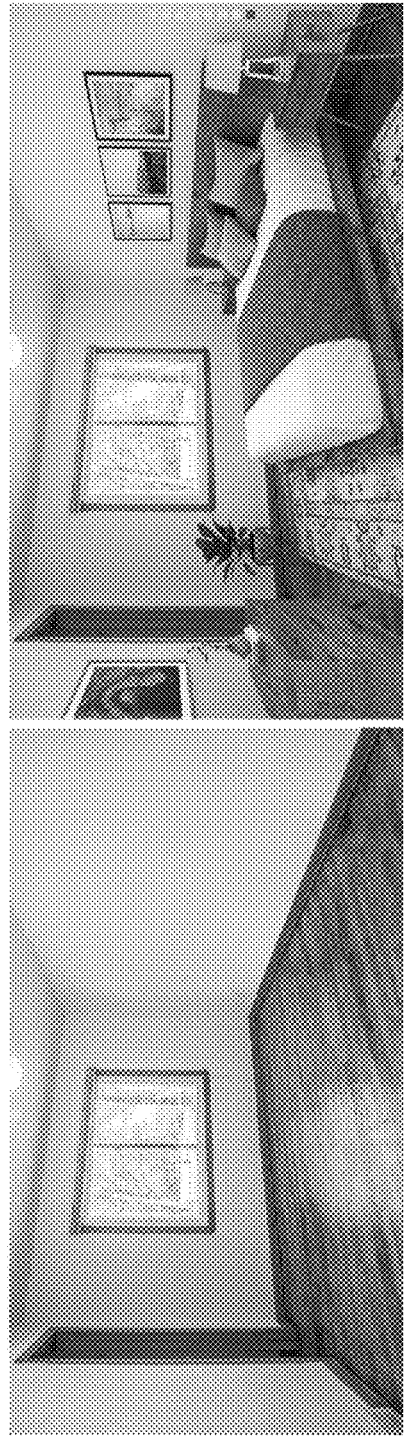

FIGS. 5A and 5B are prior art images in which static website images are replaced with static objects, in accordance with some embodiments of the disclosure. In FIG. 5A, an e-commerce store may display an object in a main window 510 and various variations of the object, such as different colors in windows 520 and different sizes in windows 530. When a user selects any one of the colors from window 520 or sizes from windows 530, the image in window 510 is replaced with the selected color or size.

The prior art displayed in FIG. 5A is different from the disclosed embodiments in several aspects. In one aspect, the prior art relates to a stationary object from an e-commerce store that is not part of a livestream. Secondly, the objects and the variations displayed in the prior art are the same to all consumers and not personalized based on consumer preferences or based on personalization and selection factors as displayed in FIG. 11. The prior art also does not allow a user to import a separate secondary object and have the object in window 510 replaced with the selected secondary object. At best, the only substitution allowed in prior art displayed in FIG. 5A (i.e., to the object displayed in window 510) are the options displayed in windows 520 and 530.

The prior art displayed in FIG. 5B is different from the disclosed embodiments in several aspects. The displayed prior art in FIG. 5B allows a user to envision bedroom furniture from a store in their own bedroom space and allows the user to determine whether the furniture fits the space and provides the look as desired. The prior art may allow a user to upload an image of their empty bedroom onto an e-commerce site and then drag and drop the furniture into the uploaded image of the empty bedroom. Doing so would provide the appearance of the furniture in their bedroom. Although a very useful tool, this prior art is also different from the disclosed embodiments in several aspects. In one aspect, the prior art relates to overlaying the image of the furniture into the image of an empty bedroom. This provides a one-to-one solution from one host to one client and is not scalable. Secondly, the prior art involves overlaying one stationary image on another stationary image, it does not involve processing of a video that is being livestreamed to several client devices simultaneously. Finally, the prior art of FIG. 5B does not selectively replace a target object with a secondary object while retaining all other objects that are not identified as target objects, it simply overlays one image on another image.

Figure 6:
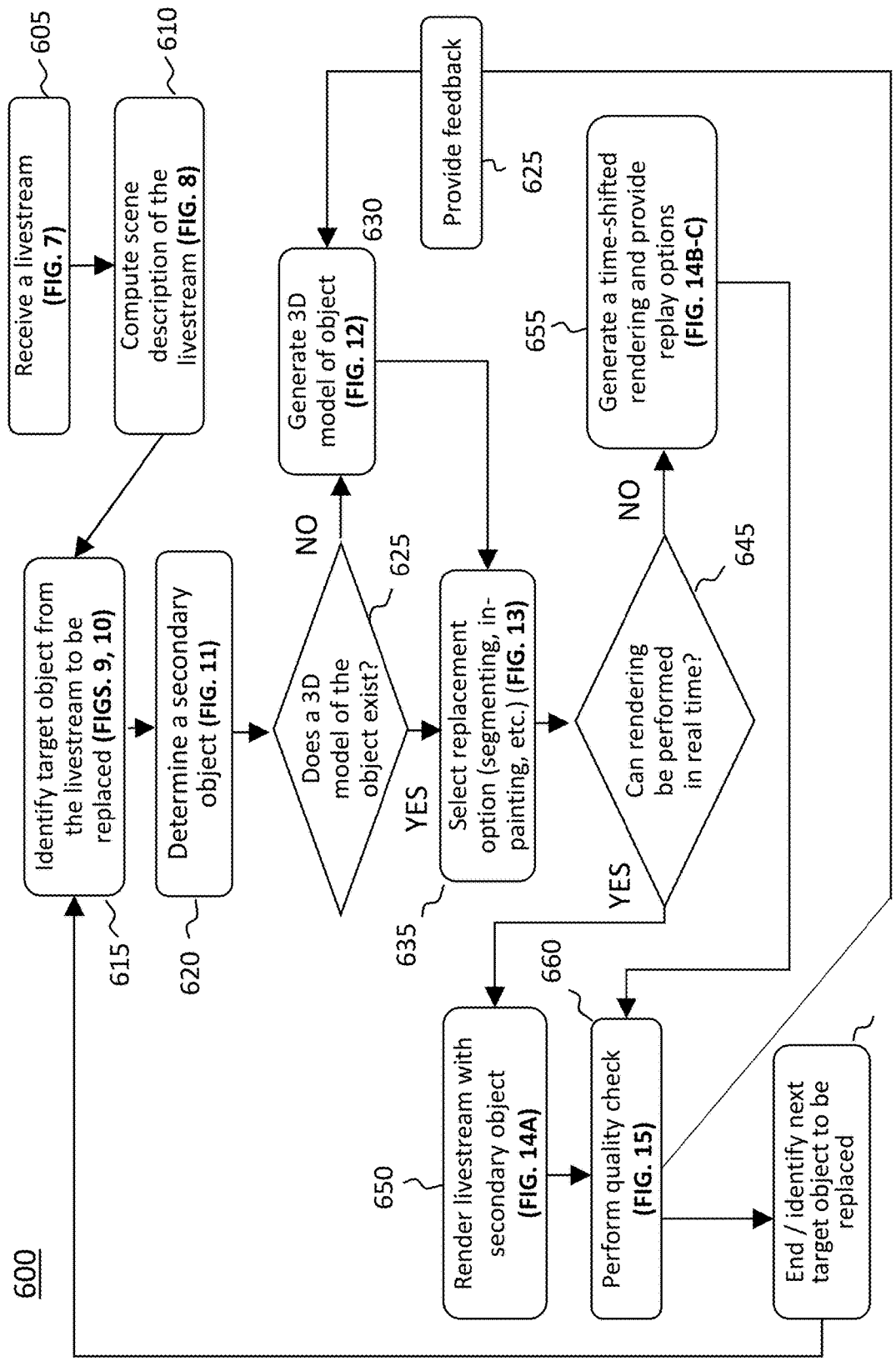
FIG. 6 is a flowchart of a process for replacing a target object(s) in the livestream, in accordance with some embodiments of the disclosure.

FIG. 6 is a flowchart of a process for replacing target object(s) in the livestream, in accordance with some embodiments of the disclosure. The process 600 may be implemented, in whole or in part, by systems or devices such as those shown in FIGS. 2-4. One or more actions of the process 600 may be incorporated into or combined with one or more actions of any other process or embodiments described herein. The process 600 may be saved to a memory or storage (e.g., any one of those depicted in FIGS. 2-3) as one or more instructions or routines that may be executed by a corresponding device or system to implement the process 600.

Figure 7:
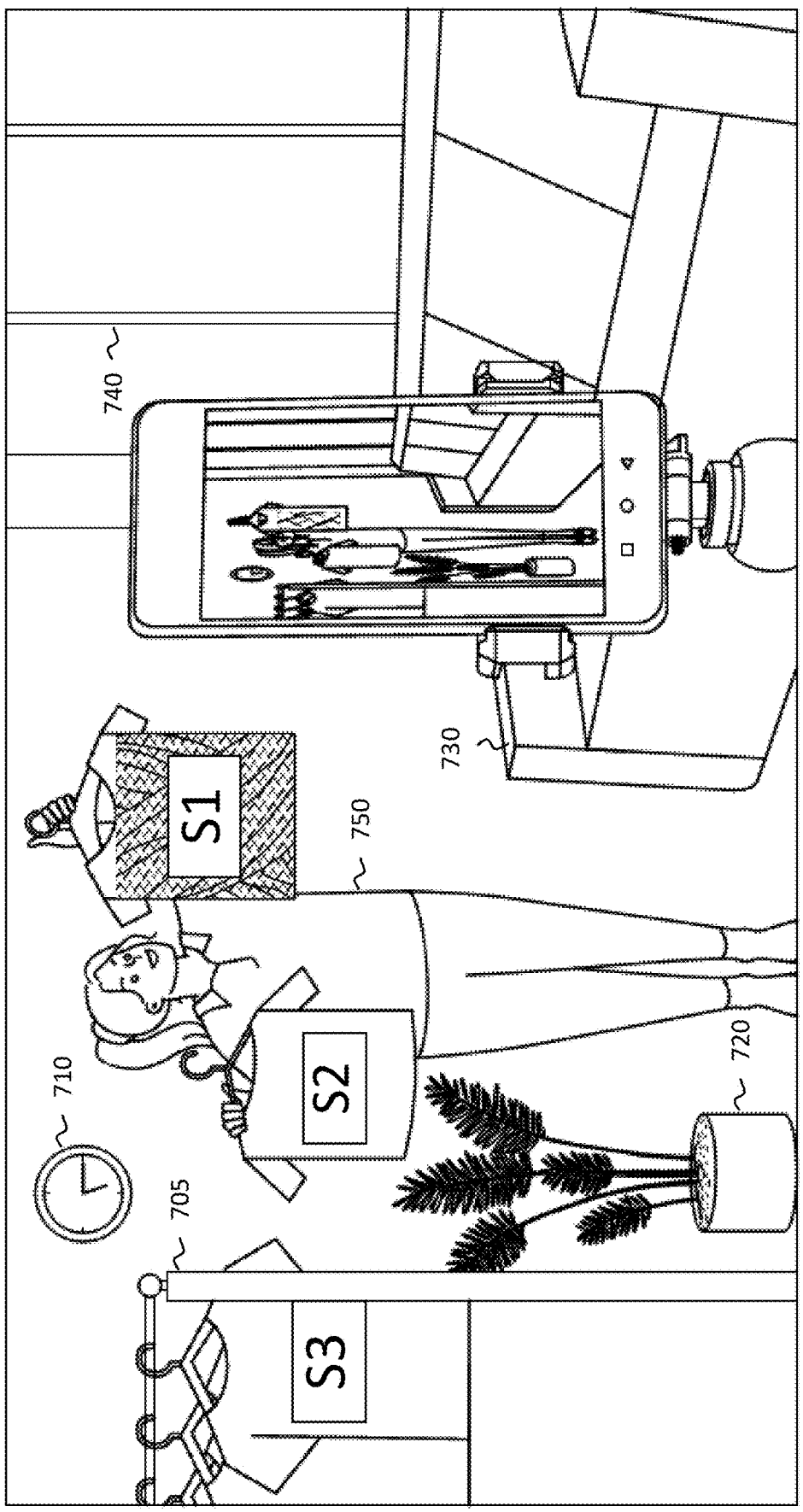
FIG. 7 is an example of a scene of a livestream in which a target object(s) is presented, in accordance with some embodiments of the disclosure.

In some embodiments, at block 605, the control circuitry 200 and/or 228 of the system, such as the system in FIG. 2, may receive a livestream. The livestream may show one or more objects and may be streamed live and in real-time from one host device to a plurality of client devices. In some embodiments, the livestream may include a single presenter that is presenting a product that is for sale. In another embodiment the livestream may include multiple presenters that are presenting multiple products that are for sale. In other embodiments the livestream may display one or more objects in motion, such as an NBA player in FIG. 10. Some examples of a livestream are depicted in FIGS. 7 and 10. The livestreaming session may be established between a presenter and a plurality of client devices and be implemented using a system, such as the system displayed in FIG. 4.

At block 610, the control circuitry 200 and/or 228 may compute the scene description associated with the received livestream. Computing the scene description may include obtaining or retrieving any and all description, details, relationship, and associations of objects within a scene, including, but not limited to spatial locations, spatial relationships, attribute details, metadata associated with scene or objects within the scene, geometry of objects within the scene. Computing the scene description may also include obtaining attributes and details associated with each object within the scene, such as each object's color, size, shape, texture, motion, and its relation and association with other objects in the scene. Computing the scene description may also include using the metadata associated with the scene to generate various types of graphs, tables, and other data associations, such as semantic associations, between the objects of the livestream. For example, using the metadata associated with the scene the control circuitry 200 and/or 228 may generate a depth graph as depicted in FIG. 8 that provides depth information related to each object from a point of view of a camera filming the livestream.

At block 615, a target object may be identified. The target object may be one of the objects within the scene description that is to be replaced by a personalized secondary object. Although references will be made to a single presenter/host and a single target object for the sake of simplicity and explanation, the embodiment may include multiple presenters and multiple target objects within a livestream.

Selection of the target object, in some embodiments, may be based on any one or more of the target object identification factors. These target object identifications factors may include identification based on a) e-commerce history, b) user profile, c) machine learning pattern, such as browsing history etc., d) audio input, e) visual input, such as a camera input, f) social media posts, g) data obtained from emails or texts, and h) any other metadata that indicates likelihood of user interest in the target object. Although a few factors have been identified, the embodiments are not so limited, and any other selection factors generated by the system or user, such as selection factors depicted in FIG. 9, may also be applied to identify and select the target object.

In some embodiments, the target object may be identified and selected based on e-commerce history of the user consuming the livestream. In these embodiments, the control circuitry 200 and/or 228 may access (or already have access to) e-commerce accounts of the user on which the user has either shopped or browed previously or stored products for late purchase. If a determination is made that the user has previously purchased a product that is similar to the object being displayed in the livestream, the control circuitry 200 and/or 228 may identify the object as target object. Aside from e-commerce, other factors described above may also be applied to identify a target object.

At block 620, the control circuitry 200 and/or 228 may select a secondary object to replace the identified target object. To do so, the control circuitry 200 and/or 228 may use one or more secondary objects selection factors for selecting the secondary object. These factors are further discussed in the description related to FIG. 11.

The secondary object selected, in some embodiments, may be contextually or semantically related to the selected target object. The secondary object selected, in some embodiments, may share at least one attribute with the target object. The secondary object selected, in some embodiments, may also be in the same genre as the selected target object. Secondary objects that are not related to the target object or not in the same genre as the target object or do not bear any other type of relationship with the target objects may not be selected as secondary objects. In some embodiments, a cloud server may query an e-commerce site to determine what secondary objects are available for selection. The process may include the cloud server transmitting the secondary object selection factors and requirements (such as those listed in FIG. 11) to the e-commerce site to obtain a list of available secondary objects that satisfy the factors. In another embodiment, the cloud server may access the e-commerce website and apply the factors to select a secondary object that may be of interest to the user and can be used to replace the target object.

Figure 12:
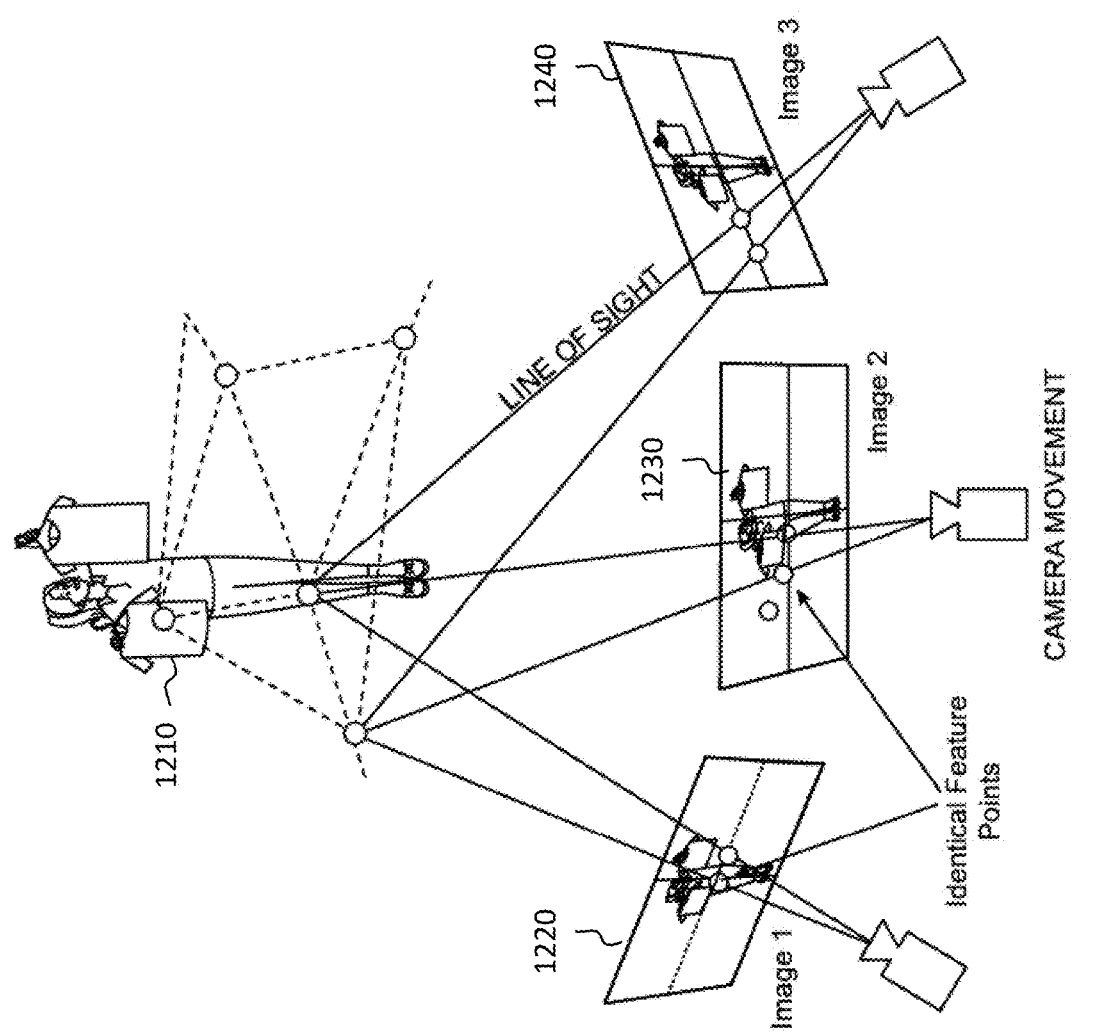
FIG. 12 is an example of a photogrammetry technique used to generate a 3D model of the target object being presented in the livestream, in accordance with some embodiments of the disclosure.

At block 625, the control circuitry 200 and/or 228 may determine if a 3D model of the selected target object exists. If so, then the 3D model may be obtained. However, if a determination is made that a 3D model of the target object does not exists, then the control circuitry 200 and/or 228 may use one of many techniques to generate the 3D model. In one embodiment, at block 630, the technique used may be to leverage many 2D video frames in the received livestream as photogrammetry images to build the 3D model over time, as depicted in FIG. 12. Further details relating to the photogrammetry technique is described below in the description related to FIG. 12. Other 3D synthesis techniques involving capturing of the volume of the target object using multiple cameras to then synthesize the volume to generate the 3D model may also be used.

At block 635, once a 3D model is created or obtained, the control circuitry 200 and/or 228 may determine a replacement option for replacing the target object with the selected secondary object. The replacement options may include any of the options described in FIG. 13, such as segmenting pixel or vox modification, inpainting, scene replacement etc.

At block 645, the control circuitry 200 and/or 228 may determine if the rendering (or re-rendering) of the livestream can be done in real-time, or within a threshold period of real-time. This may largely depend on the complexity of the replacement. For example, a simple replacement such as replacing a target object that is a shoe with a different shoe may require fewer computations and processing resources and as such may be performed in real-time or within a short lag. However, when the target object is a human who is moving, or another moving object, such as a car or an animal or any other moving object, then the replacement may be more complex and require more computations and processing resources and as such may require additional time to perform the image processing.

Figure 14A:
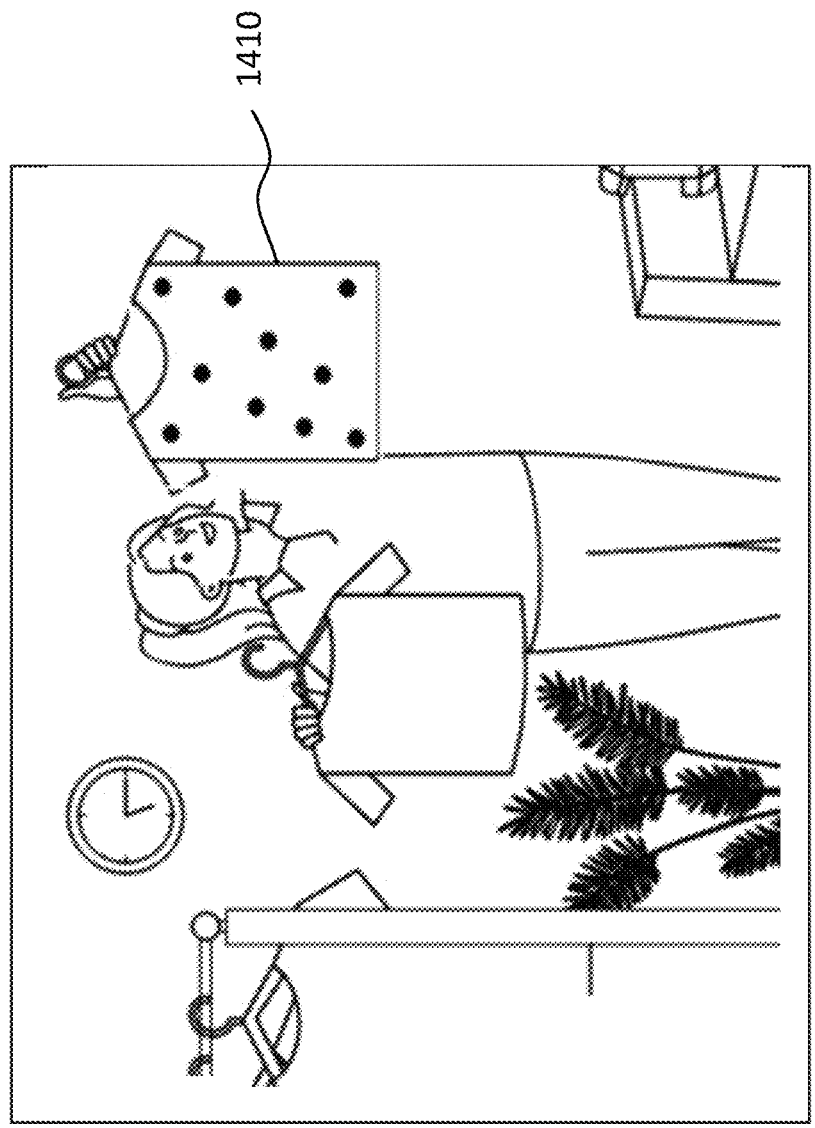
FIG. 14A is a rendering of a livestream with the target object(s) having been replaced with the secondary objects(s), in accordance with some embodiments of the disclosure.

If a determination is made at block 645 that the rendering can be performed in real time, or within a predetermined interval of the real time, then the control circuitry at block 650 may render the livestream with the secondary object (e.g., as depicted in FIG. 14A).

At block 660, the control circuitry may also perform quality checks and explore scalability options as needed.

At block 665, the control circuitry 200 and/or 228 may end the process or it may restart at block 615 to identify a next target object.

If a determination is made at block 645, that the rendering requires additional time due to the complexity of the replacement, e.g., the target object is a moving object or an object that would require a longer period of image processing, then, in one embodiment, at block 655, the replacement may be performed in a time-shifted manner. In this embodiment, the control circuitry 200 and/or 228 may perform the image processing in the background while the livestream continues to run and display the replaced scene with the secondary object in a time-shifted manner. The control circuitry 200 and/or 228 may display the time-shifted rendering of the replaced secondary object various formats, including picture-in-picture or as a marker on a timeline for scrolling back. Further details relating to the such time-shifting and its presentation to the user are described below in the description related to FIGS. 14B and 14C.

FIG. 7 is an example of a scene of a livestream in which target object(s) are presented, in accordance with some embodiments of the disclosure. As depicted, the livestream may include a plurality of objects such as women's tops S1-S3, coat hanger with hangers 705, wall clock 710, an indoor plant in a pot 720, a sofa 730, and drapes/curtains on the wall behind the sofa 740. It also depicts a woman 750 who is holding the women's topS1 that has a mesh texture.

In the livestream depicted, the woman is holding in her hands the tops S1 and S2. Accordingly, a semantic association between the woman and the tops S1 and S2 may be established. The semantic association may be used subsequently when a replacement of the target object is performed to ensure that the replaced secondary objects also maintain the same semantic association. To further illustrate this concept, as it can be seen in the livestream that another women's top S3 is hanging on a coat hanger 705. Since S3 is not connected to the woman, i.e., the woman's movement will not affect S3, it is not semantically connected to the woman.

As described earlier, although several object may be displayed in the livestream, only one or more objects may be identified as target objects that are to be replaced. The selection of which objects will be target objects is based on any one or more of the following selection factors: a) identification based on e-commerce history, b) identification based on user profile, c) identification based on machine learning pattern, such as browsing history etc., d) identification based on audio input, e) identification based on visual input, such as a camera input, f) identification based on social media posts, g) identification based on data obtained from emails or texts, h) identification based on any other metadata that indicates likelihood of user interest in the target object, and i) inferred based on the host's actions. Target object selection may also be based on other selection options described in FIG. 9. Although a few selection factors have been identified, the embodiments are not so limited, and any other selection factor generated by the system or user may also be applied to identify and select the target object. In addition to the factors described above, in some embodiments, the control circuitry 200 and/or 228 may only select those target objects that are being sold via the livestream or are available in the market for sale. For example, in one instance data relating to a user preference from a user profile indicates that the user is in the market for a sofa. Since a sofa is displayed in the background in the livestream, it may initially be identified as a potential target object. However, since this particular livestream is only showing products related to women's clothing for sale, the control circuitry may not select the sofa in the livestream as a target object that is to be replaced since it is not the focus of the livestream or a product that is offered for sale. As such, other objects that are not of relevance, e.g., do not meet the selection factors described above, and are not being sold may not be considered to be target objects.

FIG. 8 is an example of a depth graph generated based on scene description of a livestream in which target object(s) are presented by a presenter, in accordance with some embodiments of the disclosure. In some embodiments, once the scene description has been computed and data relating to the scene has been obtained, such as at block 101, the control circuitry 200 and/or 228 may use the data to generate a plurality of graphs, tables, and other associations between the objects of the livestream. In one embodiment, the control circuitry 200 and/or 228 may generate the depth graph depicted in FIG. 8. The depth graph may provide information relating to the varying depth of each object in the livestream from a selected point of view, such as the point of view of the camera used for filming and streaming the livestream.

As depicted at the bottom of FIG. 8, the depth generated provides depth relationships between the objects in the livestream. The information allows the system to determine which objects are in the foreground and which are in the background. The information also provides depth relationships between the objects, such as it allows the system to determine which object is in front of another object and which is behind or adjacent to the object. The depth graphs, which provide the depth relationships as well as information of foreground and background objects, may be used by the control circuitry 200 and/or 228 when replacing the target object with the secondary object. For example, the control circuitry 200 and/or 228 may place the secondary object at the same depth as the original target object and with the same depth from other objects as the target object.

FIG. 9 is a block diagram of target object selection options, in accordance with some embodiments of the disclosure. These selection options include an e-commerce option. In this option, the control circuitry 200 and/or 228 may determine whether an object displayed in the livestream was previously bought by the consuming user or placed on a wish list on an e-commerce platform. It may also determine whether the user browsed a related object on an e-commerce platform. If a determination is made that the user has previously purchased, browsed, or placed in a wish list, a related object, then the control circuitry 200 and/or 228 may identify the object in the livestream as a potential target object. In some instances, the control circuitry 200 and/or 228 may inform the consuming user that they have previously purchased, browsed, or placed on a wish list a related item and also at which e-commerce platform. The control circuitry 200 and/or 228 may also inform the consuming user of any updates of the product associated with the object and what those updates are.

Other selection options include reviewing and analyzing the user's profile to determine if the user may have any interest in the object of the livestream based on the information access from the user profile.

The control circuitry 200 and/or 228 may also analyze the audio and video related to the livestream to determine what is the host presenting to their audience. Based on such audio and video the control circuitry 200 and/or 228 may identify which object is being showcased in the livestream and accordingly select that object that is being presented as the target object.

The control circuitry 200 and/or 228 may also utilize AI and ML data to determine if any of the target objects may likely be of interest to the consuming user.

The control circuitry 200 and/or 228 may also access an E-catalog to determine the list of products that are to be presented prior to their presentation. The control circuitry 200 and/or 228 may then select object that are relevant or important to the user, such as based on their profile, and pre-select them as target objects before they are displayed.

FIG. 10 is an example of a moving target object, such as a person, that is displayed in the livestream and is to be replaced, in accordance with some embodiments of the disclosure. In this embodiment, a moving object, which is the NBA basketball player 1010, may be selected as the target object. As depicted in this livestream, as the NBA player 1010 proceeds to shoot the ball in the basketball hoop, another player 1020 is running alongside trying the assist the player 1010.

When such a moving target object is selected, the control circuitry 200 and/or 228 may compute the current position and orientation of the moving target object (e.g., NBA player) and predict his next position and orientation. In this example, the NBA player is running towards the basketball hoop and then jumping to release the ball from his hand and towards the basketball hoop. Based on the basketball players current trajectory of motion, the control circuitry 200 and/or 228 may predict that the next few frames will involve the basketball player 1010 proceeding along the trajectory and moving forward and jumping. As such the control circuitry 200 and/or 228 may determine the time frame for each subsequent action by the basketball player 1010 based on the player's current speed and motion. Such information may be used to predict the next frames. Once the next few frames are predicted, the control circuitry 200 and/or 228, using the predicted position and orientation, pull up the corresponding position and orientation of the secondary object from its 3D model proactively before the replacement operation and then places the secondary object in the predicted position. For example, if it will take 0.2 seconds to replace the target object and re-render the scene with the secondary object, which may be another basketball player instead of Stephen Curry, the basketball player 1010 depicted in FIG. 10, then the predicted corresponding position and orientation of the basketball player 1010 in 0.2 seconds from the current time may be computed. It may then align the position and orientation of the secondary object at the predicted 0.2 seconds mark and insert it into the scene description. Doing so will provide continuity of image without a noticeable gap in the motion of the basketball player. In other words, the basketball player 1010 will be replaced with another basketball player without a noticeable gap in the video.

FIG. 11 is a block diagram of selection factors for selecting secondary object(s), in accordance with some embodiments of the disclosure. Selection of the secondary objects to replace the target objects may be based on any one or more of the selection factors. These selection factors include user profile 1110, user purchase pattern 1120, live camera input 1130, user input 1140, voice input 1150, social media input 1160, text/email input 1170, IoT device input 1180, AI/ML recommendation 1185, and any other pattern 1190. Although a list of a few exemplary selection factors for selecting the secondary object are identified in FIG. 11, the embodiments are not so limited. Any other selection factor for selecting the secondary object either by the system or the user may also be considered. For example, input from an automobile navigation system or infotainment system may also be considered in selecting a secondary object for the user. In another example, attributes of the target object may be obtained and one of the selection criteria may be for the secondary object to share at least one common attribute with the target object.

In some embodiments, the target object is personalized for the user consuming the livestream such that the target object is mor relevant to the user than a generic target object displayed in the livestream. The personalization and customization can be anything and different for each user associated with a client device. Keeping with the example in block 101 and 102 of FIG. 1, a women's top may have a different type of personalization for a first user than a second user. For example, the first user may prefer the colors red and blue for a women's top and may like to visualize how the women's top would look in an extra-large size in the color blue while the second user may like to visualize the women's top in a green color and in a petite size. The selection factors described herein are to determine each user's preferences such that appropriate personalization to their preferences can be performed. When a preference is not listed, the control circuitry 200 and/or 228 may ascertain it by performing various analysis based on data from various sources and determine the likelihood and probability that the secondary object selected would be of interest to the user.

Since the secondary object is a personalized and customized version of the target object, the control circuitry 200 and/or 228 may ensure that there is some contextual and/or semantic relationship between the target object and the selected secondary object. For example, the control circuitry 200 and/or 228 may ensure that the secondary object selected, in some embodiments, may also be in the same genre as the selected target object.

In addition to the above, in some embodiments, user profile 1110 may be used as the selection factor for selecting the secondary object. In this embodiment, the control circuitry 200 and/or 228 may access the user's profile and analyze any saved data in the user profile that may be used in personalizing the secondary object to the user's preferences. For example, the user profile may indicate the user's preferred colors, textures, brands, price range, size, preferred stores, or anything else that the user lists in their profile or that was populated in the profile by the system. Based on the preferences and other data from the user profile, the control circuitry 200 and/or 228 may select a secondary object that is of interest to the user. The control circuitry 200 and/or 228 may determine if such a secondary object is available in the marketplace, if it is not, then the control circuitry 200 and/or 228 may select the next closest secondary object that is of preference to the user and select it as a secondary object.

In other embodiments, user purchase pattern 1120 may be used as the selection factor for selecting the secondary object. In this embodiment, the control circuitry 200 and/or 228 may access the user's account on various e-commerce sites, credit card accounts, bank accounts, and any other account used by the user to purchase products and services. The control circuitry 200 and/or 228 may then use previously purchased products as an indicator of interest in such type of secondary products that were previously purchased. For example, if the user previously purchased a blue women's top and the current target object being shown is a red women's top come on then the control circuitry 200 and/or 228 may automatically find a secondary object that is related to the target object and is blue.

In other embodiments, live camera input 1130 may be used as the selection factor for selecting the secondary object. In this embodiment, the control circuitry 200 and/or 228 may access a camera associated with the client device to capture alive camera input of the user consuming the livestream. In one embodiment, if the user makes gestures or facial expressions, the control circuitry 200 and/or 228 may analyze such gestures and facial expressions to determine what type of secondary object that is complementary to the target object might be preferred by the consuming user. For example, if a red women's top is being shown and the facial expression or a gesture indicates a dislike of the red women's top, then the control circuitry 200 and/or 228 may automatically replace it with a secondary object of a different color. In another embodiment, the control circuitry 200 and/or 228 may determine via the camera input that the user typically wears a blue or green women's tops. Accordingly, the control circuitry 200 and/or 228 may automatically select a blue women's top as a secondary object when a red women's top is being shown as the target object.

In other embodiments, user input 1140 may be used as the selection factor for selecting the secondary object. In this embodiment, the control circuitry 200 and/or 228 may, receive a user input, such as via a touch screen, hovering over mouse, or a keypad indicating the user's preference. Accordingly, the control circuitry 200 and/or 228 may take such input into consideration when selecting the secondary object.

In other embodiments, voice input 1150 may be used as the selection factor for selecting the secondary object. In this embodiment, the control circuitry 200 and/or 228 may receive a voice input either of the user or someone else nearby the user. The control circuitry 200 and/or 228 may also pick up conversations between the user and others while the user is consuming the livestream. Based on The Voice input, the control circuitry 200 and/or 228 may determine what type of secondary object may be of interest to the user. For example, in one instance, the user may be having a conversation with another person that relates to the objects shown in the livestream. In this instance, the user may say that they prefer something else instead of what is being shown. If what the user has stated contextually relates to the target object, then the control circuitry 200 and/or 228 may replace the target object with a secondary object based on the voice input received. In another instance, the control circuitry 200 and/or 228 may receive voice input from the consuming user that is directed at the target object. For example, a user looking at a red women's top may respond by saying "that would look much better in blue." The control circuitry 200 and/or 228 may pick up such voice input and take it into consideration when selecting a secondary object.

In other embodiments, social media input 1160 may be used as the selection factor for selecting the secondary object. In this embodiment, the control circuitry 200 and/or 228 may access social media sites on which the user has an account. The control circuitry 200 and/or 228 may monitor those social media sites to obtain any data that may be relevant to the target object being displayed in the livestream. For example, if the user posts any comments or likes or dislikes objects displayed on the social media platform that relate to the target object, then such data may be used by the control circuitry 200 and/or 228 in determining a secondary object.

In other embodiments, text/email input 1170 may be used as the selection factor for selecting the secondary object. In this embodiment, the control circuitry 200 and/or 228 may monitor the user's emails and text messages to obtain any data that may be relevant to the target object being displayed in the livestream. For example, if the content of the user's emails or texts relates to the target object, then such emails and texts may be analyzed and any relevant data from such emails and texts may be used by the control circuitry 200 and/or 228 in determining a secondary object.

In another embodiment, IoT device input 1180 may be used as the selection factor for selecting the secondary object. In this embodiment, the control circuitry 200 and/or 228 may access IoT devices such as camera, microphones, sensors, such as in wearable devices, to gather any data reaction or other data that may be related to the target object. For example, if the user is wearing a smartwatch that has sensors to detect the users heart rate, if the user likes or dislikes something displayed in the livestream, such data may be used and considered in selecting a secondary object. If, for example, based on analysis of the sensor data received, a determination can be made that the user usually feels excited when a blue color is displayed, then such data may be factored in to select a secondary object that is blue to replace a target object.

In other embodiments, AI/ML recommendation 1185 may be used as the selection factor for selecting the secondary object. In this embodiment, the control circuitry 200 and/or 228 may invoke an AI/ML engine running an AI/ML algorithm to determine the user's preferences, likes and dislikes over a period of time. The control circuitry may then determine patterns (such as at block 1190) and used that data in considering a secondary object.

Although a few selection factors have been described for selecting the secondary object, the embodiments are not so limited. For example, a selection may also be based on a round robin, i.e., all available variations of the same product in equal time intervals during the presentation of the object may be displayed.

FIG. 12 is an example of a photogrammetry technique used to generate a 3D model of the target object being presented in the livestream, in accordance with some embodiments of the disclosure. In this embodiment, when a 3D model of the scene description or the target object is not available, the control circuitry 200 and/or 228 may leverage many 2D video frames in the received livestream to build the 3D model over time.

Although a plurality of techniques may be used to generate the 3D model, all of which may be implemented in the embodiments, one exemplary technique is discussed in FIG. 12 below.

In some embodiments, control circuitry 200 and/or 228 may select to use a photogrammetry technique to build the 3D model. If the target object, such as target object 1210 in FIG. 12, does not have a 3D model, the technique may include obtaining a 2D images of the target object at different angles, such as at angles of the camera at 1220, 1230, and 1240. Upon obtaining sufficient 2D images or video frames from different angles, the control circuitry 200 and/or 228 may perform an image synthesis of all the 2D video frames to generate a 3D model.

Figure 13:
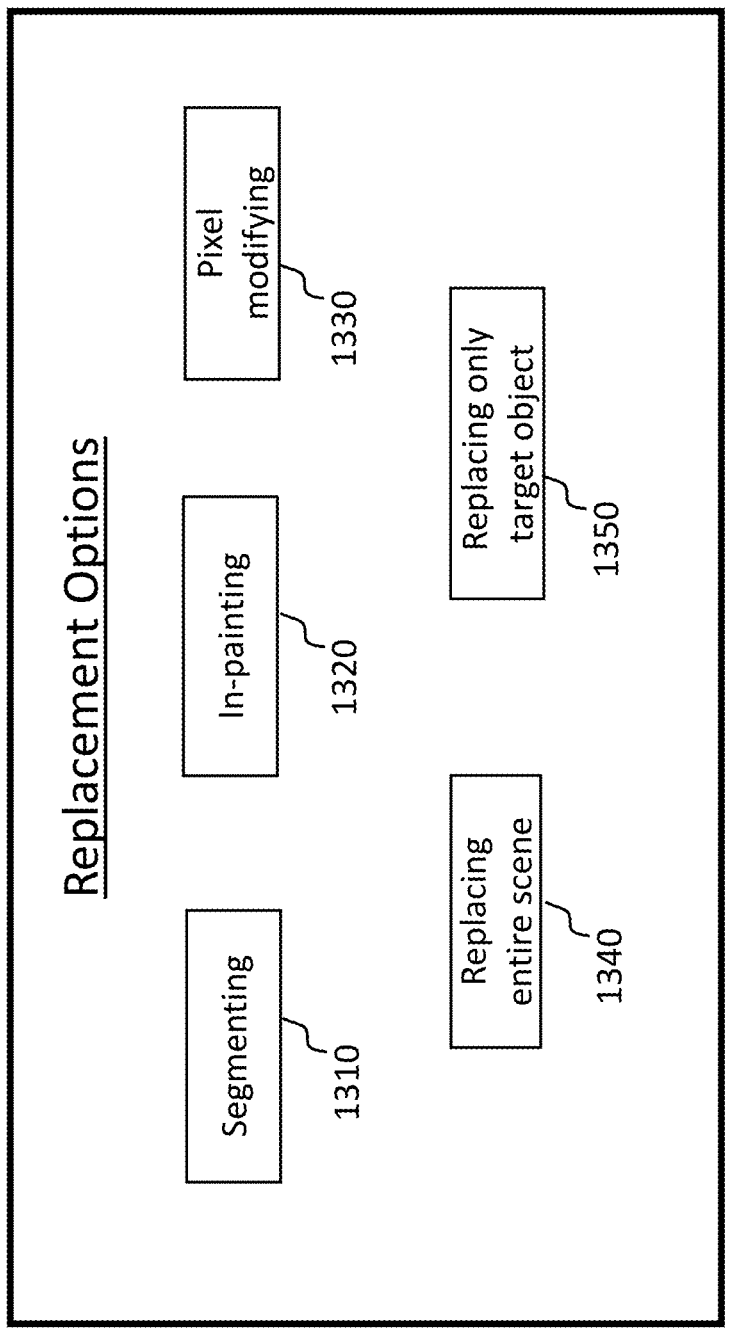
FIG. 13 is a block diagram of replacement options for replacing a target object(s) with a secondary object(s), in accordance with some embodiments of the disclosure.

FIG. 13 is a block diagram of replacement options for replacing target object(s) with secondary object(s), in accordance with some embodiments of the disclosure. These replacement options, in some embodiments, may include segmenting 1310 and replacing the segmented target object, inpainting 1320 the target object with the secondary object, pixel modifying 1330 the pixels that make the target object, replacing an entire scene 1340, or replacing only the target object 1350 and not the entire scene.

In some embodiments, the replacement option includes segmenting the target object from the livestream. A variety of deep learning techniques are leveraged to understand the relationship between the target object and the scene, i.e., to obtain a full understanding of what the target object means to the scene and its association with the surrounding objects in the scene. These deep learning techniques may include using convolutional neural network vision transformers and prototype learning. Several implementations, such as Point-Net, may be executed to retrieve the segmented scene to get the full understanding. To segment the target object, metadata from the livestream as part of the control channel may be used. In another embodiment, an audio stream may be analyzed to determine which object is to be segmented or selected. For example, speech input received from the host may indicate which object is being presented and as such that object, if selected as the target object, may be segmented. In yet another embodiment, JavaScript code of the webpage (or app UI) may be parsed to determine which object is active and being presented to then segment out that object.

In some embodiments, inpainting 1320 may be used to supplement any of the replacement options used. In other words, it's a method to fill in any overages or gaps after using any one of the replacement options. It may be performed in certain cases, if the fit of the secondary object is not perfect or not positioned in the same manner as the original target object. It may be done as a last post processing inpainting step to make sure the artifacts are minimal. During this inpainting step, measures may be taken by the control circuitry to ensure that the final rendering does not overwrite/delete any objects or its point cloud. Measures may also be taken by the control circuitry after the target object has been replaced by the secondary by performing a checksum operation to ensure that the scene rendering after the replacement has been made is the same as the original scene prior to the replacement, except for the secondary object replacing the target object.

In some embodiments, pixel modifying 1330 may be the replacement option selected to replace the target object with the secondary object. In this embodiment, the control circuitry may modify or replace the pixels that represent the target object with pixels that represent the secondary object. In other words, rather than performing scene modifications and segmentation, the replacement may be performed at the pixel level.

In some embodiments, replacing the entire scene 1340 may be the replacement option selected to replace the target object with the secondary object. In this embodiment, the control circuitry may obtain video frame in which the target object appears and replace them with video frames that include the secondary object thereby replacing the entire video frame.

In some embodiments, replacing only the target object 1350, and not the entire scene, may be the replacement option selected to replace the target object with the secondary object. In this embodiment, when the livestream is hosted in a confined setting, such as a studio, shop, home, then a majority of the background may not change and only the target object may need to be replaced. In such circumstances, the initial computation of the scene description, which includes the entire scene, may be computed on cloud side (or on an edge node). The modifications, such as a replacement of the target object with a secondary object that is only different in color or texture, may be transmitted to the client device for the client device to perform the replacement. As such, when transmitting the livestream to the client device, to reduce the consumption of computational resources, only the modifications may be transmitted.

FIG. 14A is a rendering of a livestream with the target object(s) having been replaced with the secondary objects (s), in accordance with some embodiments of the disclosure. In some embodiments, once the replacement option for the secondary object has been selected, the control circuitry may re-render the livestream with the secondary object that replaces the original target object. As depicted, the target object, which was the women's top having a mesh pattern in block 101, is replaced with a women's top 1410 having a polka dot pattern (i.e., the secondary object).

Since the difference between the secondary object and the original target object is only polka dot pattern versus mesh pattern, the control circuitry 200 and/or 228 may recognize such a replacement as a simpler replacement that requires lesser computational resources, or computational resources below a predetermined threshold. As such, in one embodiment, the control circuitry 200 and/or 228 may perform the image processing and rendering related to the replacement at the client device. In other embodiments, the original scene description may be processed at the cloud and only the modifications, which in this embodiment include a top with a polka dot pattern, or any other texture, may be transmitted to the client device for performing the replacement. In such a scenario, only the metadata indicating a different texture may be signaled to the client device.

In some embodiments, since the image processing and re-rendering related to the replacement is on the simpler side, or below a predetermined complexity threshold that would require computational resources below a threshold, the control circuitry 200 and/or 228 may be able to perform the rendering in real-time while the livestream is ongoing, or at least in a relatively short time that is below a threshold time. In other words, the re-rendering may be performed with minimal lag.

Figure 14B:
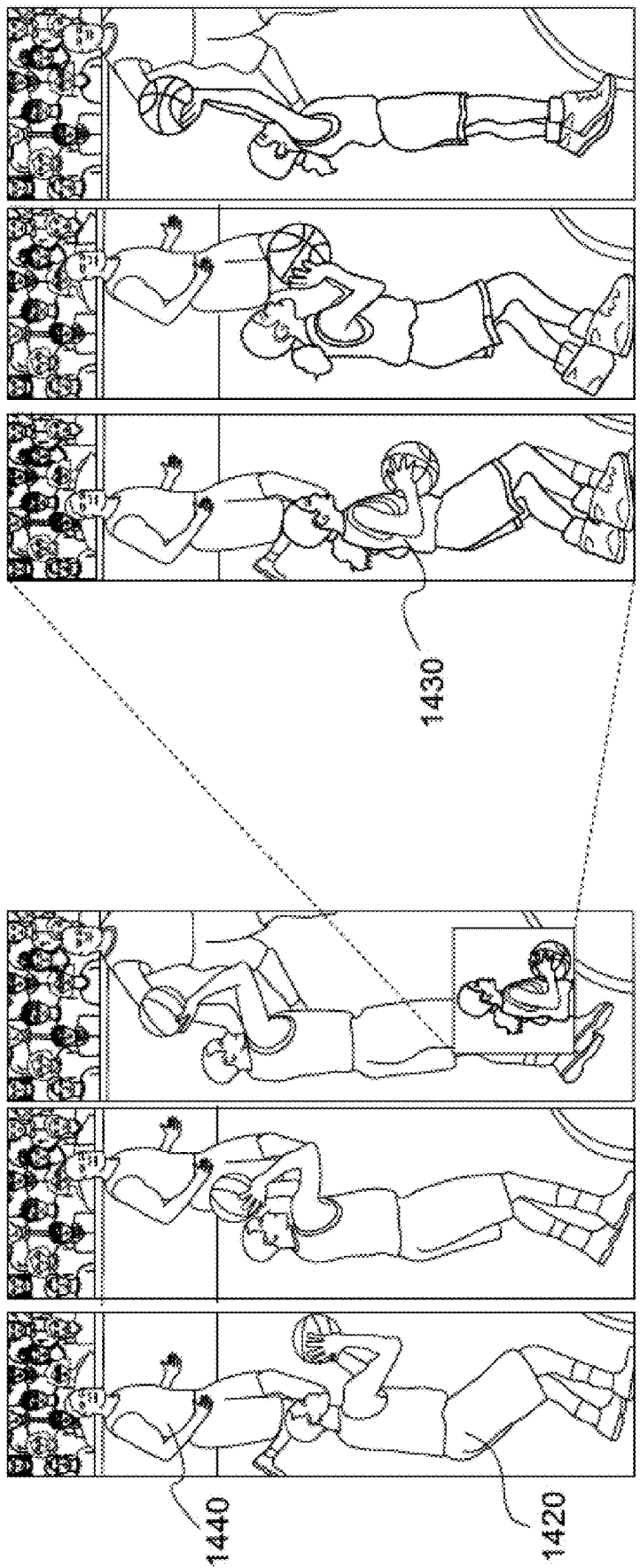
FIG. 14B is a time-shifted rendering of a livestream with the target object(s) having been replaced with the secondary objects(s), in accordance with some embodiments of the disclosure.
Figure 14C:
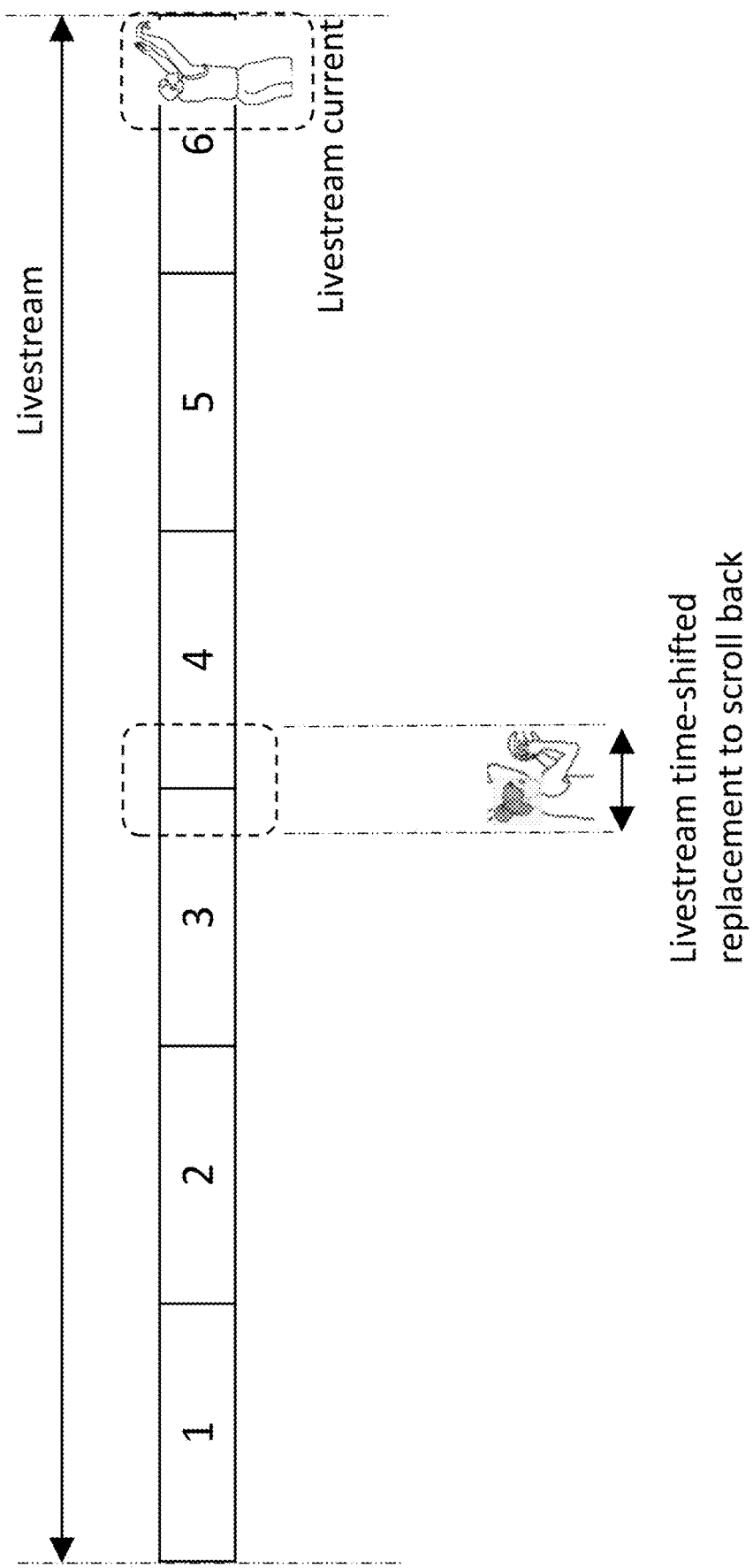
FIG. 14C is a timeline of the livestream showing the current state of the livestream and a bar to scroll back in time to view a time-shifted replacement of the target object(s) presented, in accordance with some embodiments of the disclosure.

FIG. 14B is a time-shifted rendering of a livestream with the target object(s) having been replaced with the secondary objects(s), in accordance with some embodiments of the disclosure. In this embodiment, the target object is the NBA player 1420 and he is being replaced by a secondary object, which is a WNBA player 1430. In this embodiment, the target object 1420 is on the move towards the basketball hoop to shoot the basketball. Because of replacing the NBA player 1420 with the WNBA player 1430 while the target object as well as the surrounding objects, a second NBA player 1440 are moving rapidly requires heavy computational resources, i.e., computational processing and resources above a predetermined threshold, the control circuitry 200 and/or 228 may recognize such a replacement as a complex replacement. As such, in one embodiment, the control circuitry 200 and/or 228 may perform the image processing and rendering related to the replacement in the cloud rather than on the client device. Also, since such processing may be more involved than the processing required in the example at FIG. 14A, it may require a longer time to re-render the scene with the secondary object. As such, the control circuitry may perform the image processing in the background while the livestream continues to run and displays the target object continuing to proceed towards the basketball hoop. Once the processing is completed in the background, the scene may be re-rendered and displayed to the user in a time-shifted manner. This may include presenting the time-shifted re-rendered scene in plurality of formats to the user. For example, it may be displayed a picture-in-picture, or it may be displayed on a timeline that can be scrolled back to play the re-rendered scene, as depicted in FIG. 14C.

Figure 15:
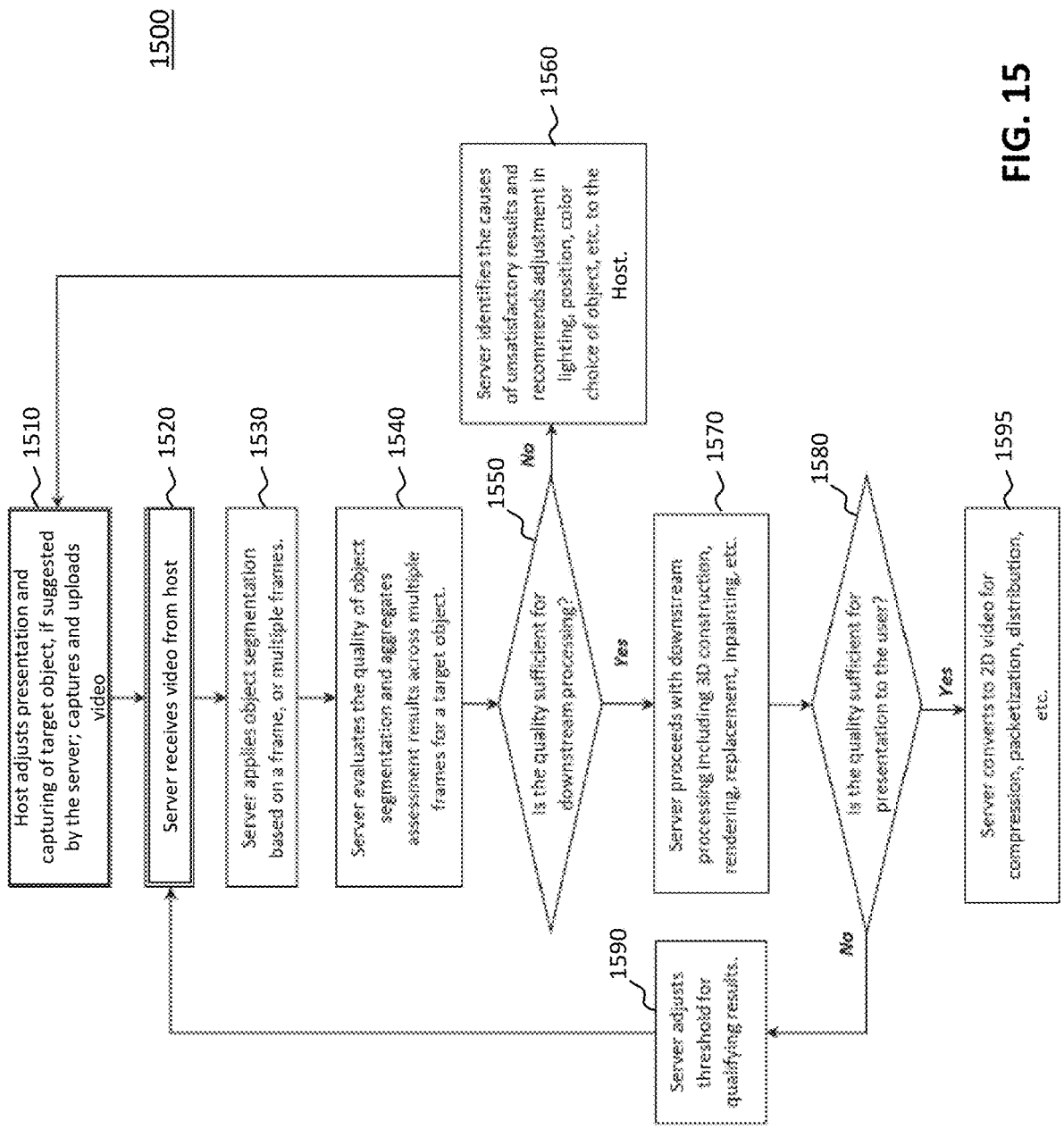
FIG. 15 is a flowchart for determining quality of the replaced object in the livestream, in accordance with some embodiments of the disclosure.

FIG. 15 is a flowchart for determining quality of the replaced object in the livestream, in accordance with some embodiments of the disclosure. The process 1500 may be implemented, in whole or in part, by systems or devices such as those shown in FIGS. 2-3. One or more actions of the process 1500 may be incorporated into or combined with one or more actions of any other process or embodiments described herein. The process 1500 may be saved to a memory or storage (e.g., any one of those depicted in FIGS. 2-3) as one or more instructions or routines that may be executed by a corresponding device or system to implement the method 1500.

In some embodiments, a replacement option may be selected by the control circuitry 200 and/or 228 for replacing the target object with the secondary object. These replacement options, in some embodiments, may include segmenting the target object from the livestream and replacing the segmented target object with the secondary object, pixel modification or replacement to the pixels that make the target object with pixels that represent the secondary object, replacing an entire scene, replacing only the target object and not the entire scene, and inpainting any overage. Although a list of a few exemplary replacement options is described, the embodiments are not so limited. Any other replacement option, such as an AI method for replacing the target object with the secondary object, are also contemplated within the embodiments. Although the process 1500 may apply to any replacement option for determining quality of the replaced object in the livestream, for the sake of explanation, segmenting has been discussed in reference to FIG. 15.

At block 1510, a host, who may also be referred to as a presenter, of the livestream may adjust their presentation and capturing of the target object, if it is suggested by the server. The suggestion by the server may be based on the quality of the presentation falling below a predetermined threshold. The quality may refer to any one or more of resolution of the scene or the target object, angles of the target object, positioning of the target object, and lighting for the scene or the target object. The server may also determine quality of any other aspect of the target object or the scene that may be part of a quality checklist inputted by the user or generated by the control circuitry. After receiving the suggestion, such as via a notification, via text message, or as a pop-up or a ticker on the host device, the host may then upload the video after making the suggested adjustment.

At block 1520, the server may receive the uploaded video that includes adjustments to the presentation made by the host.

At block 1530, the server may apply an object segmentation technique on a single frame or multiple frames. As described above, the object segmentation technique is only one of the replacement techniques that may be used in a process to replace the target object with the secondary object.

At block 1540, the server may evaluate the quality of object segmentation and aggregate assessment results across multiple frames for a target object. Evaluating quality may relate to comparing the quality of the segmentation with a predetermined threshold to determine whether the quality meets or exceeds the predetermined threshold. Quality of the segmentation may be determined by examining the quality of any one or more quality factors, such as resolution, angles, positioning, and lighting of the target object to determine whether each of the quality factors meet the predetermined threshold. Quality of the frame may also be determined and to provide the highest quality the control circuitry may leverage and select the frames that have the highest quality resolution and bandwidth while building the 3D model.

At block 1550, the server determines whether the quality is sufficient for downstream processing. In some embodiments, any one of the quality factors (e.g., resolution, angles, positioning, and lighting) may need adjustment for a better enhanced quality and in other embodiments multiple quality factors may need to be enhanced. Accordingly, the server may check whether each of the quality factors of the target object is sufficient for downstream processing.

If a determination is made at block 1550 that the quality is not sufficient for downstream processing, then at block 1560, the server identifies the causes of unsatisfactory results and recommends adjustments to the user. Such recommendations may include adjustments to the lighting, position, color, choice of object, resolution or any other aspect of the target object or its surroundings that may enhance the quality of the object segmentation. The recommendations are then transmitted to the host at block 1510 and the process from block 1510-1550 is repeated until a determination is made that the quality of object segmentation is sufficient for downstream processing.

If a determination is made at block 1550 that the quality is sufficient for downstream processing, then at block 1570, the server may proceed with downstream processing. Such downstream processing may include construction of a 3D model of the target object, replacement of the target object with the secondary object, rendering the scene with the replaced secondary object, and inpainting any overages.

At block 1580, a second quality check may include determining whether the quality of the replacement and rendering is sufficient for presentation to the downstream user, i.e., the user that is consuming the livestream and for whom the personalization with the secondary object has been performed.

If a determination is made at block 1580 that the quality is sufficient for the downstream user, then at block 1595, the server converts to the 2D video for compression, packetization, and distribution. As described earlier, the process of replacement involves a 2D to 3D conversion and then back to a 2D conversion for displaying to the downstream user. The first 2D to 3D conversion is to generate a 3D model of the scene description from a plurality of 2D images and the second conversion from 3D to 2D is to re-render the livestream in a 2D format for compression, packetization, and distribution.

If a determination is made at block 1580 that the quality is not sufficient for the downstream user, then at block 1590, the server adjusts the threshold for quality results and resumes the process from block 1520.

Figure 16:
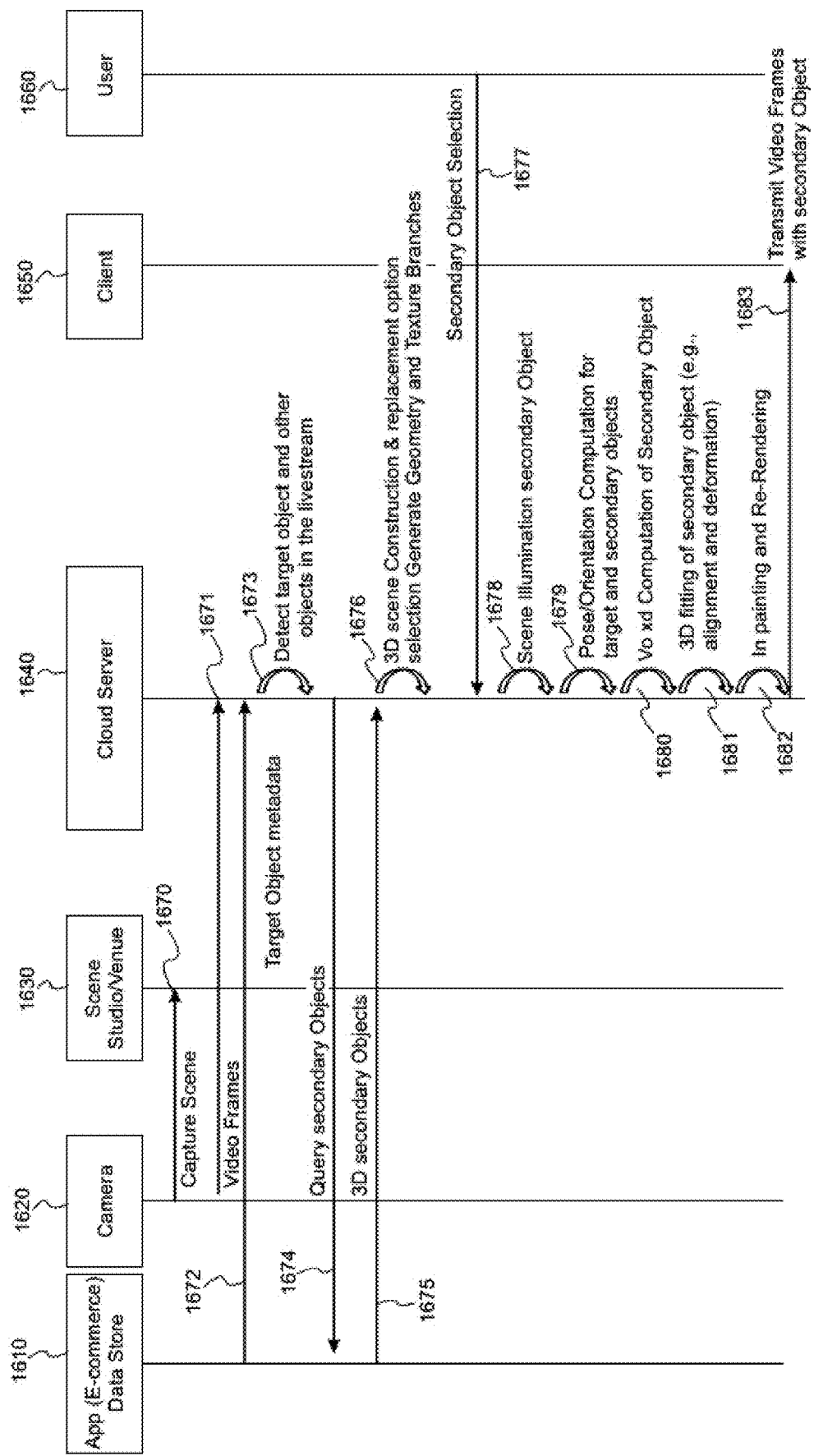
FIG. 16 is a flowchart of communication between components of a system for replacing the object being presented with a secondary object and rendering the livestream with the replaced object, in accordance with some embodiments of the disclosure.

FIG. 16 is a flowchart of a process of communication between components of a system for replacing the object being presented with a secondary object and rendering the livestream with the replaced object, in accordance with some embodiments of the disclosure. The process 1600 may be implemented, in whole or in part, by systems or devices such as those shown in FIGS. 2-3. One or more actions of the process 1600 may be incorporated into or combined with one or more actions of any other process or embodiments described herein. The process 1600 may be saved to a memory or storage (e.g., any one of those depicted in FIGS. 2-3) as one or more instructions or routines that may be executed by a corresponding device or system to implement the method 1600.

In some embodiments, the components of system that communicate with each other to perform replacement of a trigger object in a livestream with a personalized secondary object include an App (E-commerce data store) 1610, a camera 1620, scene studio/venue 1630, cloud server 1640, client 1650, and user 1660.

The process 1600 may involve a host using a camera 1620 to capture a scene at 1670. The scene captured may be that of the host presenting a target object to their audience via the live stream. At 1671, video frames associated with the captured scene may be transmitted from the camera to a cloud server 1640. The cloud server 1640 may also receive metadata associated with the target object from the App (E-commerce) data store 1610.

The cloud server 1640 after receiving the video frames of the captured scene and metadata associated with the target object may detect target object and other objects in the livestream.

The cloud server 1640 may then query available secondary objects from the App (E-commerce data store) 1610. In doing so, in some embodiments, the cloud server may provide the users preferences and selection factors for selecting the secondary object, such as those selection factors depicted in FIG. 11. In other embodiments, the cloud server may only request for those secondary objects that meet the selection factors for selecting the secondary object, such as those selection factors depicted in FIG. 11. In some embodiments, the App (E-commerce data store) 1610 may have in its catalog a plurality of secondary objects that may be contextually relevant to the target object as well as be of interest to the user. In addition to showcasing the target object, the embodiments may also allow the App (E-commerce data store) 1610 a wide variety of content variability or personalization per users. Such App (E-commerce data store) 1610 may show many different varying objects/items/products in its catalog/inventory, whose use as substitutes for target objects would not impact the presenter/creator, that may speak to a broader audience, which could translate into a broader adoption of their content, improved audience engagement as well as more monetization of the product (if they lead to a transaction based on their selection by the user for purchase).

At 1675 the cloud server 1640 may receive from the App (E-commerce data store) 1610 a 3D model of the secondary objects. If a 3D model does not exist, the cloud server may use various techniques, such as photogrammetry to generate the 3D model. A 3D model may also be generated by the consuming user using camera or a smart phone that includes lidar sensors and uploaded to the cloud server.

At 1676, the cloud server 1640 may perform a 3D scene construction and select a replacement option for replacing the target object with the secondary object. The cloud server may also generate geometry and texture branches associated with the generated 3D scene construction. The geometry branch may be used to generate a polygon mesh with any desired topology and the texture branch may be used to generate a texture field that can represent colors, textures, and specific materials at the surface points of the polygon mesh.

At 1677, the cloud server 1640 may receive a secondary object selection input from user 1660. Incorporating the users object selection, the cloud server may select from one of the secondary objects received from the App (E-commerce data store) 1610 at 1675.

Once a secondary object is selected, the cloud server 1640 may perform a plurality of processing actions that include scene illumination, pose and orientation computation, voxel computation of the secondary object, and fitting of the secondary object into the space that was previously occupied by the target object, as depicted at 1676-1681. The cloud server may also, at 1682, perform inpainting of any overages and re-render the livestream with the replaced secondary object and transmit the video frames, at 1683, with the secondary object already replaced, to the client device 1650.

Although the processes, methods, and systems described herein refer to a single presenter/host and one or more target objects and one or more secondary objects to replace the target objects, the embodiments are not so limited. The process may also be applied when there are multiple presenters/hosts, multiple target objects, multiple secondary objects. For example, if there are more than one person in the livestream, user may specify which person is from the livestream is to be the focus of object replacement and which object should be replaced. This (verbal/text/mouse click etc.) input may be analyzed and target object(s) may be identified for replacement using the embodiments described herein.

It will be apparent to those of ordinary skill in the art that methods involved in the above-described embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
  computing a scene description of a video that is being transmitted to at least one client device;
  identifying a target object and one or more of its attributes from the computed scene description;

selecting a secondary object having at least one attribute that is shared with the one or more attributes of the target object;

replacing the target object with the selected secondary object by generating a time-shifted rendering of the secondary object, wherein the time-shifted rendering of the secondary object is generated in response to a determination that the rendering of the secondary object may not be completed prior to a change in a current scene of the video; and streaming the video with replay options for replaying the video with the replaced secondary object.

2. The method of claim 1, wherein identifying the target object further comprises:
detecting a plurality of objects associated with the scene description; and
selecting at least one object as the target object, from the plurality of objects associated with the scene description, wherein the selection comprises selecting an object being presented by a presenter as the target object that is to be replaced.

3. The method of claim 1, wherein identifying the target object further comprises:
analyzing e-commerce data related to a user that is consuming the video;
determining that the user had previously purchased an object that shares an attribute with a specific object associated with the scene description of a video; and
in response to determining that the user had previously purchased an object that shares an attribute with the specific object, identifying the specific object as the target object.

4. The method of claim 1, further comprising, generating a 3D model of the target object, wherein, generating the 3D model comprises:
capturing the target object from a plurality of angles;
generating a 2D scene for each of the plurality of angles;
performing a 3D synthesis of each generated 2D scene; and
generating a 3D model based on the performed synthesis.

5. The method of claim 4, further comprising, generating metadata associated with the 3D model, wherein the metadata generated includes a first set of metadata that relates to topology of objects in the scene description and a second set of metadata that relates to any one or more of color, texture, or surface of the objects in the scene description.

6. The method of claim 1, wherein replacing the target object with the selected secondary object further comprises:
selecting a replacement option; and
re-rendering a portion of the video with the selected replacement option, wherein the re-rendered portion video includes the secondary object instead of the target object.

7. The method of claim 1, further comprising:
segmenting out the target object from the scene;
replacing the segmented-out space with the secondary object; and
causing inpainting in the video to cover any gaps left behind after replacing the segmented-out space with the secondary object.

8. The method of claim 1, wherein replacing the target object with the selected secondary object further comprises:
determining an orientation of the target object at a current time; and
inserting the secondary object at the same orientation as the target object when replacing the target object with the secondary object.

9. The method of claim 1, further comprising:
determining that the identified target object is a garment worn by a person in the video; and
in response to determining that the identified target object is the garment worn by the person in the video:
determining shape alignment attributes of the garment to the person;
determining deformation of the garment; and
inserting the secondary object by maintaining at least one or more of the shape alignment attributes and deformation as that of the garment prior to the garment being replaced by the secondary object.

10. The method of claim 9, further comprising:
creating a semantic association between the garment and the person; and
maintaining the sematic association after replacement of the garment with the secondary object.

11. The method of claim 1, further comprising:
determining that the identified target object is touching the person in the video; and
in response to determining that the identified target object is touching the person in the video, creating a semantic association between the target object and the person, wherein the semantic association captures attributes associated with the touching such that the replaced secondary object obtains a same semantic association with the person when replaced.

12. The method of claim 1, wherein the identified target object is a moving object and replacing the moving object with the selected secondary object further comprises:
estimating a position and orientation of the target object at a time when it will be replaced by the secondary object; and
placing the secondary object at the estimated position and orientation at time of replacement.

13. The method of claim 1, wherein the replay options for replaying the video include both an option to play either the video with the target object or the video with the secondary object.

14. A system comprising:
communications circuitry configured to transmit a video to at least one client device; and
control circuitry configured to:
compute a scene description of the video that is being transmitted to the at least one client device;
identify a target object and one or more of its attributes from the computed scene description;
select a secondary object having at least one attribute that is shared with the one or more attributes of the target object;
replace the target object with the selected secondary object by generating a time-shifted rendering of the secondary object, wherein the time-shifted rendering of the secondary object is generated in response to a determination that the rendering of the secondary object may not be completed prior to a change in a current scene of the video; and
stream, using the communications circuitry, the video with replay options for replaying the video with the replaced secondary object.

15. The system of claim 14, wherein identifying the target object further comprises, the control circuitry configured to:
detect a plurality of objects associated with the scene description; and
select at least one object as the target object, from the plurality of objects associated with the scene description, wherein the selection comprises selecting an object being presented by a presenter as the target object that is to be replaced.

16. The system of claim 14, wherein identifying the target object further comprises, the control circuitry configured to:
analyze e-commerce data related to a user that is consuming the video;
determine that the user had previously purchased an object that shares an attribute with a specific object associated with the scene description of a video; and
in response to determining that the user had previously purchased an object that shares an attribute with the specific object, identify the specific object as the target object.

17. The system of claim 16, further comprising, in response to determining that the user had previously purchased an object that shares an attribute with the specific object, the control circuitry configured to present e-commerce data relating to the previous purchase to the user.

18. The system of claim 14, further comprising, the control circuitry configured to generate a 3D model of the target object and metadata associated with the 3D model, wherein the metadata generated includes a first set of metadata that relates to topology of objects in the scene description and a second set of metadata that relates to any one or more of color, texture, or surface of the objects in the scene description.

19. The system of claim 14, wherein replacing the target object with the selected secondary object further comprises, the control circuitry configured to:
select a replacement option; and
re-render a portion of the video with the selected replacement option, wherein the re-rendered portion video includes the secondary object instead of the target object.

20. The system of claim 14, further comprising, the control circuitry configured to:
segment out the target object from the scene;
replace the segmented-out space with the secondary object; and
cause inpainting in the video to cover any gaps left behind after replacing the segmented-out space with the secondary object.

21. The system of claim 14, wherein replacing the target object with the selected secondary object further comprises, the control circuitry configured to:
determine an orientation of the target object at a current time; and
insert the secondary object at the same orientation as the target object when replacing the target object with the secondary object.

22. The system of claim 14, further comprising, the control circuitry configured to:
determine that the identified target object is a garment worn by a person in the video; and
in response to determining that the identified target object is the garment worn by the person in the video, the control circuitry further configured to:
determine shape alignment attributes of the garment to the person;
determine deformation of the garment; and
insert the secondary object by maintaining at least one or more of the shape alignment attributes and deformation as that of the garment prior to the garment being replaced by the secondary object.

23. The system of claim 22, further comprising, the control circuitry configured to:
create a semantic association between the garment and the person; and
maintain the sematic association after replacement of the garment with the secondary object.

24. The system of claim 14, further comprising, the control circuitry configured to:
determine that the identified target object is touching the person in the video; and
in response to determining that the identified target object is touching the person in the video, create a semantic association between the target object and the person, wherein the semantic association captures attributes associated with the touching such that the replaced secondary object obtains a same semantic association with the person when replaced.

25. The system of claim 14, wherein the identified target object is a moving object and replacing the moving object with the selected secondary object further comprises, the control circuitry configured to:
estimate a position and orientation of the target object at a time when it will be replaced by the secondary object; and
place the secondary object at the estimated position and orientation at time of replacement.

* * * * *